(12) United States Patent
Adjaoute

(10) Patent No.: US 10,997,599 B2
(45) Date of Patent: May 4, 2021

(54) METHOD FOR DETECTING MERCHANT DATA BREACHES WITH A COMPUTER NETWORK SERVER

(71) Applicant: Brighterion, Inc., Purchase, NY (US)

(72) Inventor: Akli Adjaoute, Mill Valley, CA (US)

(*) Notice: Subject to any disclaimer, the term of this patent is extended or adjusted under 35 U.S.C. 154(b) by 0 days.

(21) Appl. No.: 16/592,249

(22) Filed: Oct. 3, 2019

(65) Prior Publication Data
US 2020/0074471 A1    Mar. 5, 2020

Related U.S. Application Data

(63) Continuation of application No. 14/815,934, filed on Jul. 31, 2015, now abandoned, which is a continuation-in-part of application No. 14/525,273, filed on Oct. 28, 2014, now Pat. No. 10,290,001, which is a continuation of application No. 14/815,848, filed on Jul. 31, 2015, now abandoned.

(51) Int. Cl.
| | |
|---|---|
| *G06Q 40/00* | (2012.01) |
| *G06Q 20/40* | (2012.01) |
| *G06F 21/62* | (2013.01) |
| *G06F 16/28* | (2019.01) |

(52) U.S. Cl.
CPC ....... *G06Q 20/4016* (2013.01); *G06F 16/283* (2019.01); *G06F 16/285* (2019.01); *G06F 21/6245* (2013.01); *G06Q 40/12* (2013.12)

(58) Field of Classification Search
CPC .................................................. G06Q 40/00
USPC ........................................................ 705/30
See application file for complete search history.

(56) References Cited

U.S. PATENT DOCUMENTS

| | | | |
|---|---|---|---|
| 5,377,354 | A | 12/1994 | Scannell et al. |
| 5,692,107 | A | 11/1997 | Simoudis et al. |
| 5,819,226 | A | 10/1998 | Gopinathan et al. |
| (Continued) | | | |

FOREIGN PATENT DOCUMENTS

| | | |
|---|---|---|
| DE | 4230419 | 3/1994 |
| EP | 0647903 | 4/1995 |
| (Continued) | | |

OTHER PUBLICATIONS

Office Action From U.S. Appl. No. 16/168,566 (dated Mar. 4, 2020).
(Continued)

*Primary Examiner* — Ojo O Oyebisi

(57) ABSTRACT

A method for minimizing merchant data breach damage depends on computers and financial networks to carry out its steps. Every payment card transaction witnessed each day by a network server is assessed by a "jury" of fraud classification algorithms and assigned a fraud-risk-verdict. Those payment transactions receiving a high-risk-fraud verdict are retained and sorted into a table according to transaction date, cardholder, and merchant. The raw verdicts are normalized and standardized according to merchant size groups, e.g., to even the comparisons that will be made. A daily tally is made for each merchant of the number of suspected-card-visits, the number of highly-probable-card-visits, and the number of total-card-visits. A merchant data-breach alert is issued if a final score and sum of the normalized verdicts exceeds a threshold.

20 Claims, 18 Drawing Sheets

(56) References Cited

U.S. PATENT DOCUMENTS

| | | | |
|---|---|---|---|
| 5,822,741 A | 10/1998 | Fischthal | |
| 6,009,199 A | 12/1999 | Ho | |
| 6,026,397 A | 2/2000 | Sheppard | |
| 6,029,154 A | 2/2000 | Pettitt | |
| 6,122,624 A | 9/2000 | Tetro et al. | |
| 6,161,130 A | 12/2000 | Horvitz et al. | |
| 6,254,000 B1 | 7/2001 | Degen et al. | |
| 6,272,479 B1 | 8/2001 | Farry et al. | |
| 6,330,546 B1* | 12/2001 | Gopinathan | G06Q 20/00 705/35 |
| 6,347,374 B1 | 2/2002 | Drake et al. | |
| 6,424,997 B1 | 7/2002 | Buskirk, Jr. et al. | |
| 6,453,246 B1 | 9/2002 | Agrafiotis et al. | |
| 6,535,728 B1 | 3/2003 | Perfit et al. | |
| 6,601,048 B1 | 7/2003 | Gavan et al. | |
| 6,647,379 B2 | 11/2003 | Howard et al. | |
| 6,711,615 B2 | 3/2004 | Porras et al. | |
| 6,782,375 B2 | 8/2004 | Abdel-Moneim et al. | |
| 6,889,207 B2 | 5/2005 | Slemmer et al. | |
| 7,007,067 B1 | 2/2006 | Azvine et al. | |
| 7,036,146 B1 | 4/2006 | Goldsmith | |
| 7,089,592 B2 | 8/2006 | Adjaoute | |
| 7,165,037 B2 | 1/2007 | Lazarus et al. | |
| 7,251,624 B1 | 7/2007 | Lee et al. | |
| 7,406,502 B1 | 7/2008 | Oliver et al. | |
| 7,433,960 B1 | 10/2008 | Dube et al. | |
| 7,457,401 B2 | 11/2008 | Lawyer et al. | |
| 7,464,264 B2 | 12/2008 | Goodman et al. | |
| 7,483,947 B2 | 1/2009 | Starbuck et al. | |
| 7,562,122 B2 | 7/2009 | Oliver et al. | |
| 7,631,362 B2 | 12/2009 | Ramsey | |
| 7,668,769 B2 | 2/2010 | Baker et al. | |
| 7,813,937 B1 | 10/2010 | Pathria et al. | |
| 7,835,919 B1 | 11/2010 | Bradley et al. | |
| 7,853,469 B2 | 12/2010 | Maitland et al. | |
| 8,015,108 B2 | 9/2011 | Haggerty et al. | |
| 8,027,439 B2 | 9/2011 | Zoldi et al. | |
| 8,036,981 B2 | 10/2011 | Shirey et al. | |
| 8,041,597 B2 | 10/2011 | Li et al. | |
| 8,090,648 B2 | 1/2012 | Zoldi et al. | |
| 8,458,069 B2 | 6/2013 | Adjaoute | |
| 8,484,301 B2 | 7/2013 | Wilson et al. | |
| 8,548,137 B2 | 10/2013 | Zoldi et al. | |
| 8,555,077 B2 | 10/2013 | Davis et al. | |
| 8,561,007 B2 | 10/2013 | Challenger et al. | |
| 8,572,736 B2 | 10/2013 | Lin | |
| 8,744,979 B2 | 6/2014 | Sundelin et al. | |
| 8,805,737 B1 | 8/2014 | Chen et al. | |
| 9,264,442 B2 | 2/2016 | Bart et al. | |
| 9,400,879 B2 | 7/2016 | Tredoux et al. | |
| 9,721,296 B1 | 8/2017 | Chrapko | |
| 9,898,741 B2 | 2/2018 | Siegel et al. | |
| 10,339,606 B2 | 7/2019 | Gupta et al. | |
| 2002/0188533 A1 | 12/2002 | Sanchez et al. | |
| 2002/0194119 A1 | 12/2002 | Wright et al. | |
| 2003/0009495 A1 | 1/2003 | Adjaoute | |
| 2003/0084449 A1 | 5/2003 | Chane et al. | |
| 2003/0158751 A1 | 8/2003 | Suresh et al. | |
| 2004/0073634 A1 | 4/2004 | Haghpassand | |
| 2004/0111363 A1 | 6/2004 | Trench et al. | |
| 2004/0153555 A1 | 8/2004 | Haverinen et al. | |
| 2004/0225473 A1 | 11/2004 | Aoki et al. | |
| 2006/0041464 A1 | 2/2006 | Powers et al. | |
| 2006/0149674 A1* | 7/2006 | Cook | G06Q 40/02 705/44 |
| 2006/0212350 A1 | 9/2006 | Ellis et al. | |
| 2007/0067853 A1 | 3/2007 | Ramsey | |
| 2007/0112667 A1 | 5/2007 | Rucker | |
| 2007/0124246 A1 | 5/2007 | Lawyer et al. | |
| 2007/0174164 A1 | 7/2007 | Biffle et al. | |
| 2007/0174214 A1 | 7/2007 | Welsh et al. | |
| 2007/0239604 A1 | 10/2007 | O'Connell et al. | |
| 2008/0086365 A1 | 4/2008 | Zollino et al. | |
| 2008/0104101 A1 | 5/2008 | Kirshenbaum et al. | |
| 2008/0162259 A1 | 7/2008 | Patil et al. | |
| 2008/0281743 A1 | 11/2008 | Pettit | |
| 2009/0307028 A1 | 12/2009 | Eldon et al. | |
| 2010/0027527 A1 | 2/2010 | Higgins et al. | |
| 2010/0082751 A1 | 4/2010 | Meijer et al. | |
| 2010/0115610 A1 | 5/2010 | Tredoux et al. | |
| 2010/0125470 A1 | 5/2010 | Chisholm | |
| 2010/0191634 A1* | 7/2010 | Macy | G06N 3/08 705/35 |
| 2010/0228656 A1 | 9/2010 | Wasserblat et al. | |
| 2010/0305993 A1 | 12/2010 | Fisher | |
| 2011/0016041 A1 | 1/2011 | Scragg | |
| 2011/0035440 A1 | 2/2011 | Henkin et al. | |
| 2011/0055196 A1 | 3/2011 | Sundelin et al. | |
| 2011/0055264 A1 | 3/2011 | Sundelin et al. | |
| 2011/0238566 A1 | 9/2011 | Santos | |
| 2011/0258049 A1 | 10/2011 | Ramer et al. | |
| 2011/0276468 A1 | 11/2011 | Lewis et al. | |
| 2011/0307382 A1 | 12/2011 | Siegel et al. | |
| 2012/0047072 A1 | 2/2012 | Larkin | |
| 2012/0137367 A1 | 5/2012 | Dupont et al. | |
| 2012/0203698 A1 | 8/2012 | Duncan et al. | |
| 2012/0226613 A1 | 9/2012 | Adjaoute | |
| 2013/0018796 A1 | 1/2013 | Kolhatkar et al. | |
| 2013/0204755 A1 | 8/2013 | Zoldi et al. | |
| 2013/0305357 A1 | 11/2013 | Ayyagari et al. | |
| 2014/0082434 A1 | 3/2014 | Knight et al. | |
| 2014/0149128 A1 | 5/2014 | Getchius | |
| 2014/0180974 A1 | 6/2014 | Kennel et al. | |
| 2014/0279803 A1 | 9/2014 | Burbank et al. | |
| 2015/0046224 A1 | 2/2015 | Adjaoute | |
| 2015/0161609 A1 | 6/2015 | Christner | |
| 2015/0193263 A1 | 7/2015 | Nayyar et al. | |
| 2015/0279155 A1 | 10/2015 | Chun et al. | |
| 2015/0348042 A1 | 12/2015 | Jivraj et al. | |
| 2016/0260102 A1 | 9/2016 | Nightengale et al. | |
| 2017/0006141 A1 | 1/2017 | Bhadra | |
| 2017/0083386 A1 | 3/2017 | Wing et al. | |
| 2017/0270534 A1 | 9/2017 | Zoldi et al. | |
| 2017/0347283 A1 | 11/2017 | Kodaypak | |
| 2018/0040064 A1 | 2/2018 | Grigg et al. | |
| 2018/0048710 A1 | 2/2018 | Altin | |
| 2018/0151045 A1 | 5/2018 | Kim et al. | |
| 2018/0182029 A1 | 6/2018 | Vinay | |
| 2018/0208448 A1 | 7/2018 | Zimmerman et al. | |
| 2018/0253657 A1 | 9/2018 | Zhao et al. | |
| 2019/0156417 A1 | 5/2019 | Zhao et al. | |
| 2019/0213498 A1 | 7/2019 | Adjaoute | |
| 2019/0236695 A1 | 8/2019 | McKenna et al. | |
| 2019/0250899 A1 | 8/2019 | Riedl et al. | |
| 2019/0265971 A1 | 8/2019 | Behzadi et al. | |
| 2019/0278777 A1 | 9/2019 | Malik et al. | |

FOREIGN PATENT DOCUMENTS

| | | |
|---|---|---|
| EP | 0631453 | 12/2001 |
| WO | 9406103 | 3/1994 |
| WO | 9501707 | 1/1995 |
| WO | 9628948 | 9/1996 |
| WO | 9703533 | 1/1997 |
| WO | 98/32086 | 7/1998 |

OTHER PUBLICATIONS

Office Action From U.S. Appl. No. 14/522,463 (dated Mar. 24, 2020).

Office Action From U.S. Appl. No. 16/205,909 (dated Apr. 22, 2020).

Office Action From U.S. Appl. No. 16/398,917 (dated Mar. 11, 2020).

Office Action From U.S. Appl. No. 16/369,626 (dated Jun. 2, 2020).

Raid, Feb. 28, 2014, www.prepressure.com, printed through www.archive.org (Year: 2014).

Clarke et al., Dynamic Forecasting Behavior by Analysts Theory and Evidence, 2005, Journal of Financial Economics (Year:2005).

Data Compaction, 2013, Wikipedia, printed through www.archive.org (date is in the URL in YYYYMMDD format) (Year:2013).

Data Consolidation, 2014, Techopedia, printed through www.archive.org (date is in the URL in YYYYMMDD format) (Year:2014).

(56) References Cited

OTHER PUBLICATIONS

Data Mining Mar. 31, 2014. Wikipedia, Printed through www.archive.org, date is in the URL in YYYMMDD format (Year:2014).
Data Warehousing—Metadata Concepts, Mar. 24, 2014, TutorialsPoint, printed through www.archive.org (Date is in the URP in YYYMMDD format) (Year:2014).
Dave, Kushal, Steve Lawrence, and David M. Pennock. "Mining the peanut gallery: Opinion extration and semantic classification of product reviews." Proceedings of the 12th international conference on WorldWide Web. ACM. 2003.
I Need Endless Rolling List, 2007, QuinStreet, Inc. (Year: 2007).
Office Action From U.S. Appl. No. 14/243,097 (dated Jun. 16, 2015).
Office Action From U.S. Appl. No. 14/243,097 (dated Nov. 5, 2018).
Office Action From U.S. Appl. No. 14/522,463 (dated Dec. 1, 2015).
Office Action From U.S. Appl. No. 14/522,463 (dated Feb. 11, 2019).
Dffice Action From U.S. Appl. No. 14/522,463 (dated Jun. 20, 2018).
Office Action From U.S. Appl. No. 14/522,463 (dated Jun. 5, 2015).
Office Action From U.S. Appl. No. 14/522,463 (dated Oct. 10, 2018).
Office Action From U.S. Appl. No. 14/613,383 (dated Apr. 23, 2018).
Office Action From U.S. Appl. No. 14/613,383 (dated Aug. 14, 2015).
Office Action From U.S. Appl. No. 14/613,383 (dated Dec. 13, 2018).
Yang,Yiming. "Expert network: Effective and efficient learning from human decisions in text categorization and retrieval." Proceedings of the 17th annual international ACM SIGIR conference on Research and development in information retrieval Springer-Verlag New York, Inc., 1994.
"2000 Internet Fraud Statistics," National Fraud Information Center web site, http://www.fraud.org, 2001.
"AXENT Technologies' NetProwlerTM and Intruder AlertTM", Hurwitz Report, Hurwitz Group, Inc., Sep. 2000.
"CBA 1994 Fraud Survey," California Bankers Association web site, http://www.calbankers.com/legal/fraud.html, Jun. 1996.
"Check Fraud Against Businesses Proliferates," Better Business Bureau web site, http://www.bbb.org/library/checkfraud.asp, 2000.
"Check Fraud Statistics," National Check Fraud Center web site, http://www.ckfraud.org/statistics.html, Date Unkonwn.
"Consumers and Business Beware of Advance Fee Loan and Credit Card Fraud," Better Business Bureau web site, http://www.bbb.org/library/feeloan.asp, 20003.
"CyberSource Fraud Survey," CyberSource, Inc., web site, http://www.cybersource.com/solutions/risk_management/us_fraud_survey.xml, Date Unknown.
"eFalcon Helps E-Merchants Control Online Fraud," Financial Technology Insights Newsletter, HNC Software, Inc., Aug. 2000.
"Guidelines to Healthcare Fraud," National health care Anti-Fraud Association web site, http://www.nhcaa.org/factsheet_guideline.html, Nov. 19, 1991.
"Health Insurance Fraud," http://www.helpstopcrime.org, Date Unknown.
"HIPPA Solutions: Waste, Fraud, and Abuse," ViPS, Inc., web site, http://www.vips.com/hippa/combatwaste.html, 2001.
"HNC Insurance Solutions Introduces Spyder Software for Healthcare Fraud and Abuse Containment," HNC Software, Inc., press release, Dec. 4, 1998.
"Homeowners Insurance Fraud," http://www.helpstopcrime.org, Date Unknown.
"Insurance Fraud: The Crime You Pay For," http://www.insurancefraud.org/facts.html, Date Unknown.
"PRISM FAQ", Nestor, Inc., www.nestor.com, Date Unknown.
"SET Secure Electronic Transaction Sepcification," Book 1: Business Description, May 1997.
"Telemarketing Fraud Revisited," Better Business Bureau web site, http://www.bbb.org/library/tele.asp, 2000.
"The Impact of Insurance Fraud," Chapter 5, Ohio Insurance Facts, Ohio Insurance Institute, 2000.
"VeriCompTM Claimant," HNC Software, Inc., web site, 2001.
"What is Insurance Fraud?," http://www.helpstopcrime.rog, Date Unkonwn.
"Wireless Fraud FAQ," World of Wireless Communications web site, http://www.wow-com/consumer/faq/articles.cfm?textonly=1&ID=96, Date Unknown.
"Workers Compensation Fraud," http://www.helpstopcrime.org, Date Unknown.
A. Aadjaoute, "Responding to the e-Commerce Promise with Non-Algorithmic Technology," Handbook of E-Business, chapter F2, edited by J. Keyes, Jul. 2000.
A. Valdes and H. Javitz,"The SRI IDES Statistical Anomaly Detector," May 1991.
D. Anderson, T. Frivold, and A. Valdes, "NExt-Generation intrusion Detection Expert System (NIDES): A Summary," SRI Computer Science Laboratory technical report SRI-CSL-95-07, May 1995.
Debar et al., "Neural network Component for an Intrustion Detection System", Proceedings for the Computer Society Symposium on Research in Security and Privacy, vol. SYMP.13, May 4, 1992, 240-250.
Denault et al., "Intrusion Detection: approach and performance issues of the SECURENET system", Computers and Security, 13 (1994), 495-508.
John J. Xenakis, 1990, InformationWeek, 1990. n296,22.
K. G. DeMarrais, "Old-fashioned check fraud still in vogue," Bergen record Corp. web site, http://www.bergen.com/biz/savvy24200009242.htm, Sep. 24, 2000.
M. B. Guard, "Calling Card Fraud—Travelers Beward!," http://www.bankinfo.com/security/scallingcardhtml, Jun. 11, 1998.
Maria Seminerio, Dec. 13, 1999, PC week, 99.
Office Action from U.S. Appl. No. 09/810,313 (dated Jun. 22, 2005).
Office Action from U.S. Appl. No. 09/810,313 (dated Mar. 24, 2006).
Office Action from U.S. Appl. No. 09/810,313 (dated Nov. 23, 2004).
Office Action from U.S. Appl. No. 11/455,146 (dated Sep. 29, 2009).
P.A. Porras and P.G. Neumann, "EMERALD: Event Monitoring Enabling Responses to Anomalous Live Disturbances," National Information Systems Security Conference, Oct. 1997.
P.E. Proctor, "Computer Misuse Detection System (CMDSTM) Concpets," SAIC Science and technology Trends, pp. 137-145, Dec. 1996.
S. Abu-Hakima, M. ToLoo, and T. White, "A Multi-Agent Systems Approach for Fraud Detection in Personal Communication Systems," Proceedings of the Fourteenth National Conference on Artificial Intelligence (AAAI-97), pp. 1-8, Jul. 1997.
Teng et al., "Adaptive real-time anomaly detection using inductively generated sequential patterns", Proceedings of the Computer Society Symposium on research in Security and Privacy, vol. SYMP. 11, May 7, 1990, 278-284.
Office Action from U.S. Appl. No. 14/522,463 (dated Oct. 3, 2019).
Office Action from U.S. Appl. No. 14/522,463 (dated Jul. 18, 2019).
Office Action From U.S. Appl. No. 16/205,909 (dated Dec. 27, 2019).
Office Action From U.S. Appl. No. 16/205,909 (dated Sep. 27, 2019).
Office Action From U.S. Appl. No. 16/398,917 (dated Sep. 26, 2019).
Office Action From U.S. Appl. No. 15/947,790 (dated Nov. 18, 2019).
Office Action From U.S. Appl. No. 14/525,273 (dated Jun. 26, 2018).
Office Action From U.S. Appl. No. 14/525,273 (dated Feb. 9, 2015).
Office Action From U.S. Appl. No. 14/525,273 (dated May 19, 2015).
Office Action From U.S. Appl. No. 15/968,568 (dated Sep. 16, 2019).
Office Action From U.S. Appl. No. 15/961,752 (dated Oct. 3, 2019).
Office Action From U.S. Appl. No. 14/673,895 (dated Oct. 30, 2015).

(56) References Cited

OTHER PUBLICATIONS

Office Action From U.S. Appl. No. 14/673,895 (dated Feb. 12, 2016).
Office Action From U.S. Appl. No. 14/673,895 (dated Jul. 14, 2017).
Office Action From U.S. Appl. No. 14/673,895 (dated Oct. 2, 2017).
Office Action From U.S. Appl. No. 14/690,380 (dated Jul. 15, 2015).
Office Action From U.S. Appl. No. 14/690,380 (dated Dec. 3, 2015).
Office Action From U.S. Appl. No. 14/690,380 (dated Jun. 30, 2016).
Office Action From U.S. Appl. No. 14/690,380 (dated Nov. 17, 2016).
Office Action From U.S. Appl. No. 14/690,380 (dated Jun. 27, 2017).
Office Action From U.S. Appl. No. 14/690,380 (dated Nov. 20, 2017).
"10 Popular health care provider fraud schemes" by Charles Piper, Jan./Feb. 2013, FRAUD Magazine, www.fraud-magazine.com.
Report to the Nations on Occupational Fraud and Abuse, 2012 Global Fraud Study, copyright 2012, 76 pp., Association of Certified Fraud Examiners, Austin, TX.
Big Data Developments in Transaction Analytics, Scott Zoldi, Credit Scoring and Credit Control XIII Aug. 28-30, 2013 Fair Isaacs Corporation (FICO).
Credit card fraud detection using artificial neural networks tuned by genetic algorithms, Dissertation: Carsten A. W. Paasch, Copyright 2013 Proquest, LLC.
Fraud Detection Using Data Analytics in the Healthcare Industry, Discussion Whitepaper, ACL Services Ltd., (c) 2014, 8pp.
Fraud Detection of Credit Card Payment System by Genetic Algorithm, K.RamaKalyani, D. UmaDevi Department of Computer Science, Sri Mittapalli College of Engineering, Guntur, AP, India., International Journal of Scientific & Engineering Research vol. 3, Issue 7, Jul. 1, 2012, ISSN 2229-5518.
Healthcare Fraud Detection, http://IJINIIW.21ct.com'solutions/healthcare-fraud-detection/, (c) 2013 21CT, Inc.
Prevent Real-time fraud prevention, brochure, Brighterion, Inc. San Francisco, CA.
"Agent-Based modeling: Methods and Techniques for Simulating Human Systems", Eric Bonabeau, Icosystem Corporation, 545 Concord Avenue, Cambridge, MA 02138, 7280-7287; PNAS; May 14, 2002; vol. 99; suppl. 3; www.pnas.org/cgi/doi/10.1073/pnas.082080899.
Office Action From U.S. Appl. No. 14/454,749 (dated Feb. 3, 2017).
Office Action From U.S. Appl. No. 14/514,381 (dated Dec. 31, 2014).
Office Action From U.S. Appl. No. 14/514,381 (dated May 13, 2015).
Office Action From U.S. Appl. No. 14/514,381 (dated Jan. 10, 2018).
Office Action From U.S. Appl. No. 14/514,381 (dated Apr. 2, 2018).
Office Action From U.S. Appl. No. 14/815,848 (dated Sep. 30, 2015).
Office Action From U.S. Appl. No. 14/815,848 (dated Mar. 14, 2016).
Office Action From U.S. Appl. No. 14/815,934 (dated Sep. 30, 2015).
Office Action From U.S. Appl. No. 14/815,934 (dated Feb. 11, 2016).
Office Action From U.S. Appl. No. 14/815,934 (dated Sep. 23, 2016).
Office Action From U.S. Appl. No. 14/815,934 (dated Apr. 7, 2017).
Office Action From U.S. Appl. No. 14/815,940 (dated Oct. 1, 2015).
Office Action From U.S. Appl. No. 14/815,940 (dated Dec. 28, 2017).
Office Action From U.S. Appl. No. 14/929,341 (dated Dec. 22, 2015).
Office Action From U.S. Appl. No. 14/929,341 (dated Feb. 4, 2016).
Office Action From U.S. Appl. No. 14/929,341 (dated Aug. 19, 2016).
Pffice Action From U.S. Appl. No. 14/929,341 (dated Jul. 31, 2018).
Office Action From U.S. Appl. No. 14/938,844 (dated Apr. 11, 2016).
Office Action From U.S. Appl. No. 14/938,844 (dated Jan. 25, 2017).
Office Action From U.S. Appl. No. 14/938,844 (dated May 1, 2017).
Office Action From U.S. Appl. No. 14/938,844 (dated Aug. 23, 2017).
Office Action From U.S. Appl. No. 14/935,742 (dated Mar. 2, 2016).
Office Action From U.S. Appl. No. 14/935,742 (dated Sep. 22, 2016).
Office Action From U.S. Appl. No. 14/935,742 (dated Mar. 29, 2017).
Office Action From U.S. Appl. No. 14/935,742 (dated May 31, 2017).
Office Action From U.S. Appl. No. 14/941,586 (dated Jan. 5, 2017).
Office Action From U.S. Appl. No. 14/941,586 (dated May 2, 2017).
Office Action From U.S. Appl. No. 14/956,392 (dated Feb. 2, 2016).
Office Action From U.S. Appl. No. 14/956,392 (dated Mar. 28, 2016).
Office Action From U.S. Appl. No. 14/956,392 (dated Nov. 3, 2016).
Office Action From U.S. Appl. No. 14/956,392 (dated May 3, 2017).
Office Action From U.S. Appl. No. 14/986,534 (dated May 20, 2016).
Office Action From U.S. Appl. No. 14/986,534 (dated Sep. 7, 2017).
Office Action From U.S. Appl. No. 14/517,771 (dated Jul. 15, 2015).
Office Action From U.S. Appl. No. 14/517,771 (dated Dec. 31, 2015).
Office Action From U.S. Appl. No. 14/517,771 (dated Sep. 8, 2016).
Office Action From U.S. Appl. No. 14/517,771 (dated Sep. 20, 2018).
Office Action From U.S. Appl. No. 14/517,863 (dated Feb. 5, 2015).
Office Action From U.S. Appl. No. 14/517,863 (dated Aug. 10, 2015).
Office Action From U.S. Appl. No. 14/675,453 (dated Jun. 9, 2015).
Office Action From U.S. Appl. No. 14/517,872 (dated Jan. 14, 2015).
Office Action From U.S. Appl. No. 14/517,872 (dated Jul. 31, 2015).
Office Action From U.S. Appl. No. 14/520,361 (dated Feb. 2, 2015).
Office Action From U.S. Appl. No. 14/520,361 (dated Jul. 17, 2015).
Office Action From U.S. Appl. No. 14/520,361 (dated Jul. 11, 2018).
Office Action From U.S. Appl. No. 14/521,386 (dated Jan. 29, 2015).
Office Action From U.S. Appl. No. 14/521,386 (dated Nov. 1, 2018).
Office Action From U.S. Appl. No. 14/521,667 (dated Jan. 2, 2015).
Office Action From U.S. Appl. No. 14/521,667 (dated Jun. 26, 2015).
Office Action From U.S. Appl. No. 14/634,786 (dated Oct. 2, 2015).
Office Action From U.S. Appl. No. 16/168,566 (dated Sep. 9, 2020).
Office Action From U.S. Appl. No. 16/226,246 (dated Aug. 4, 2020).
Office Action From U.S. Appl. No. 16/184,894 (dated Sep. 21, 2020).
Office Action From U.S. Appl. No. 16/677,458 (dated Sep. 24, 2020).
Office Action From U.S. Appl. No. 16/601,226 (dated Sep. 2, 2020).
Office Action From U.S. Appl. No. 16/674,980 (dated Sep. 3, 2020).
Office Action From U.S. Appl. No. 16/856,131 (dated Sep. 24, 2020).
Office Action From U.S. Appl. No. 16/679,819 (dated Sep. 25, 2020).

* cited by examiner

Profile

|  | mcc | zipcode | amount |  |
|---|---|---|---|---|
|  | Field₁ | Field₂ | Field₃ | Fieldₙ |
| January | | | | |
| February | | | | |
| December | | | | |
| Thanksgiving | | | | |
| Christmas | | | | |

1302

| Zipcode | Frequency |
|---|---|
| 94104 | 9 |
| 94105 | 7 |
| 94110 | 3 |
| | 19 |

| | |
|---|---|
| Minimum | 5.80 |
| Maximum | 274.50 |
| Average | 84.67 |
| Sum | 684.86 |

1304
Example 1 | Dec 5 2013 | grocery | 94110 | 90.54 |
risk score: ↑unknown ↓known ↓(avg) — low risk

1306
Example 2 | Dec 5 2013 | grocery | 94108 | 64.87 |
risk score: ↓known ↑unknown ↓(avg) — low risk

1308
Example 3 | Dec 5 2013 | flight | 32541 | 765.98 |
risk score: ↑unknown ↑unknown ↑(high) — high risk
  far away

METHOD FOR DETECTING MERCHANT DATA BREACHES WITH A COMPUTER NETWORK SERVER

RELATED APPLICATIONS

The current patent application is a continuation patent application which claims priority benefit with regard to all common subject matter to U.S. patent application Ser. No. 14/815,934, filed Jul. 31, 2015, and originally entitled METHOD FOR DETECTING MERCHANT DATA BREACHES WITH A COMPUTER NETWORK SERVER, which, itself, is a continuation-in-part application of and claims priority benefit with regard to all common subject matter to: (A) U.S. patent application Ser. No. 14/525,273, filed Oct. 28, 2014, and entitled DATA BREACH DETECTION, now U.S. Pat. No. 10,290,001; and (B) U.S. patent application Ser. No. 14/815,848, filed Jul. 31, 2015, and entitled AUTOMATION TOOL DEVELOPMENT METHOD FOR BUILDING COMPUTER FRAUD MANAGEMENT APPLICATIONS. The listed earlier-filed non-provisional applications are hereby incorporated by reference in their entireties into the current patent application.

BACKGROUND OF THE INVENTION

Field of the Invention

The present invention relates to methods of financial fraud control and management, and more particularly to using computers and network servers to raise much earlier alerts whenever a merchant data breach of payment card accounts has manifested.

Background

Serious large scale data breaches are happening regularly and have been making news every month now for many years. The latter ones seem bigger in scale than the earlier ones, and the corporate and government systems that have been compromised had appeared to be secured with the best techniques and equipment. Worse, when breaches do occur, it is the abuses of the personal financial data of individuals that were recorded in the databases that appears first and raises red flags. It takes sometimes months before the common denominators (the merchant or agency) are recognized, and by then serious damage has already developed.

Cardholders will each individually settle into routine behaviors, and therefore their payment card transactions will follow those routines. All cardholders, as a group, are roughly the same and produce roughly the same sorts of transactions. But on closer inspection the general population of cardholders will cluster into various subgroups and behave in similar ways as manifested in the transactions they generate.

Card issuers want to encourage cardholders to use their cards, and want to stop and completely eliminate fraudsters from being able to pose as legitimate cardholders and get away with running transactions through to payment. So card issuers are challenged with being able to discern who is legitimate, authorized, and presenting a genuine transaction, from the clever and aggressive assaults of fraudsters who learn and adapt all too quickly. All the card issuers have before them are the millions of innocuous transactions flowing in every day.

Consumers who shopped at Target Stores the three weeks between Nov. 27, 2013 and Dec. 18, 2013, received notice that their personal information was compromised, and were therefore eligible for money from a nationwide Data Breach Settlement. Target agreed to set aside $19 million for the 40 million credit and debit card accounts that various MasterCard banks and credit unions that had issued and had been swept up in the breach. Target disclosed the massive breach on Dec. 19, 2013, during the peak of that year's holiday shopping season. The Disclosure distressed all shoppers who then avoided the retailer in masses, fearing the lack of Target security would expose their private data. That significantly depressed Target's profits and sales for months thereafter. And as of July 2015, the major issues falling out of this Breach remain unresolved.

What is needed is a method of fraud management that can tightly follow end monitor the behavior of all payment-card holders and merchants. And then act quickly in real-time when a fraudster has, with a single compromise of a large merchant, put the millions of customers of that merchant at risk for financial losses because their personal and account information are now subject to immediate worldwide abuse by criminals.

SUMMARY OF THE INVENTION

Briefly, a method embodiment of the present invention depends on computers and financial networks to carry out its steps. Every payment transaction occurring each day is assessed by a "jury" of fraud classification algorithms and assigned a fraud-risk-verdict. Those payment transactions receiving the high-risk-fraud verdicts are retained and sorted into a table according to transaction date, cardholder, and merchant. The verdicts are normalized and standardized according to merchant size groups, e.g., to even the comparisons that will be made. A daily tally is made for each merchant of the number of suspected-card-visits, the number of highly-probable-card-visits, and the number of total-card-visits. A merchant data-breach alert is issued if a final score and sum of the normalized verdicts exceeds a threshold.

The above and still further objects, features, and advantages of the present invention will become apparent upon consideration of the following detailed description of specific embodiments thereof, especially when taken in conjunction with the accompanying drawings.

BRIEF DESCRIPTION OF THE DRAWINGS

FIG. 13 is a diagram representing a simplified smart agent profile and how individual constituent datapoints are compared to running norms and are accumulated into an overall risk score;

DETAILED DESCRIPTION OF THE INVENTION

In the first Parent Application, a method embodiment of the present invention is described that depends on computers and financial networks to carry out its steps. Every payment transaction occurring each day is assessed by a "jury" of fraud classification algorithms and given a fraud-risk-verdict. Those payment transactions receiving high-risk-fraud verdicts are retained and sorted into a table according to transaction date, cardholder and merchant. The verdicts are normalized and standardized according to merchant size groups to even the comparisons that will be made. A daily tally is made of the number of suspected-card-visits, highly-probable-card-visits, and total-card-visits per merchant. A merchant data-breach alert is issued if a final score and sum of the normalized verdicts exceeds a threshold.

Figure 1:
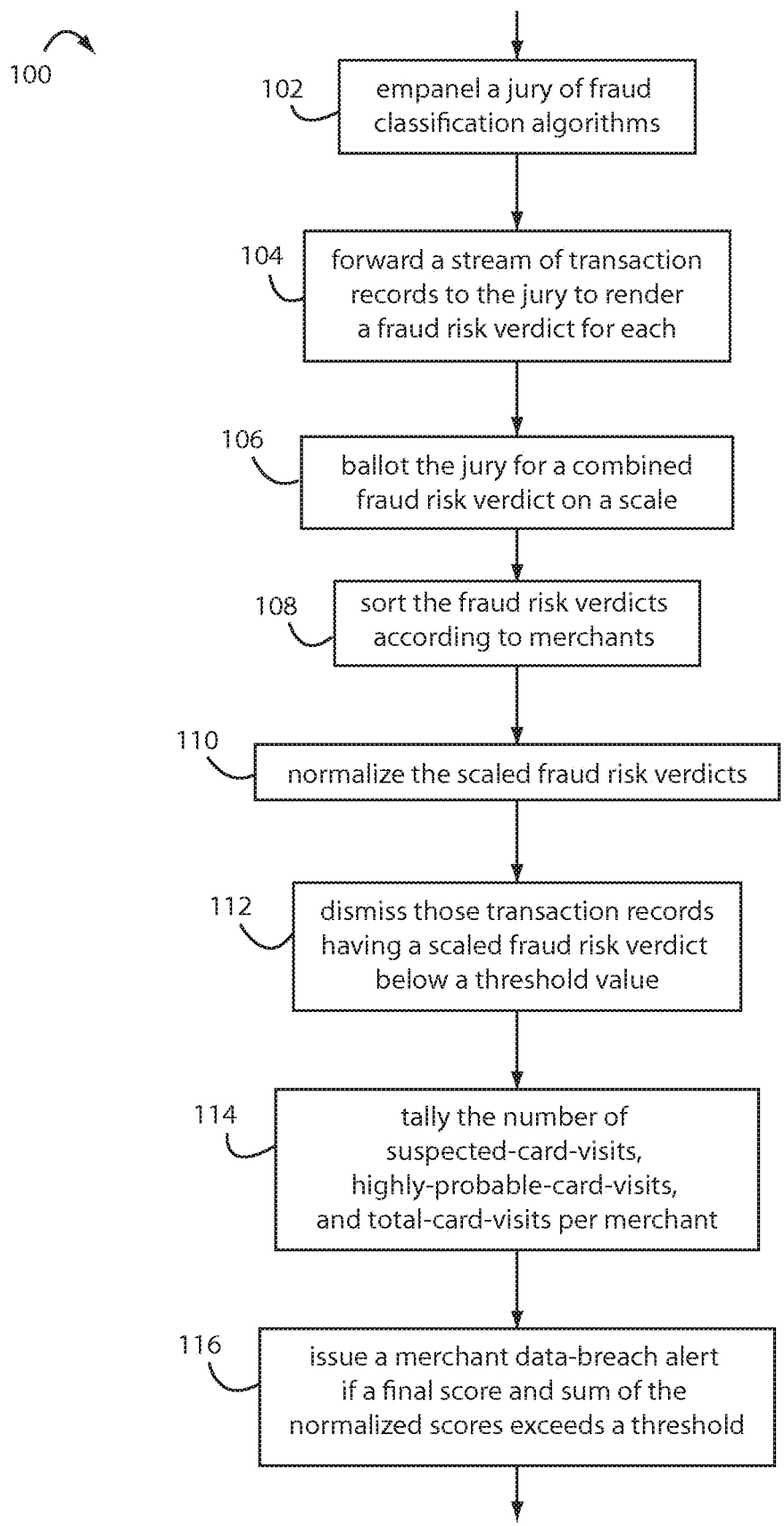
FIG. 1 is diagram illustrating the steps of the method for raising much earlier alerts whenever a merchant data breach of payment card accounts has manifested.

In a method embodiment 100 of FIG. 1, a step 102 empanels a jury of fraud classification algorithms to receive a stream of transaction records in a step 104. The jury is charged in a step 106 with rendering millions of ballots of fraud-risk-verdicts daily. Each fraud-risk-verdict represents a blending of the opinions of each juror, and the combination verdict is assigned to a scale. A step 108 sorts the fraud-risk-verdicts according to the merchant involved. A step 110 normalizes the scaled fraud-risk-verdicts. A step 112 dismisses those transaction records having a fraud-risk-verdict scaled below a threshold value. A step 114 tallies the number of suspected-card-visits, the number of highly-probable-card-visits, and the number of total-card-visits per merchant. A step 116 issues a merchant data-breach alert if a final score and sum of the normalized verdicts exceeds a threshold.

The "jury" of fraud classification algorithms is just that, a heterogeneous mix of traditional fraud classification algorithms is empaneled like a courtroom jury to each hear the evidence in unison. Some deliberation may occur, and a "judge" may provide formal controls. The Jury produces fraud-risk-verdicts for each payment transaction presented that day on a financial network. Network servers and broadband communications equipment are needed to keep up with the millions of records involved in the milliseconds of time that can be afforded.

General payment fraud algorithms are "trained" with archives of supervised and unsupervised data to produce a ready-to-use merchant data breach application. Really what occurs is various parameters in the framework are initialized. These trained payment fraud algorithms can then be sold to assist third parties in their use of our fraud management methods. Commercial clients are challenged with processing real-time transactions and authorization requests for fraud verdicts. The applied payment fraud algorithms are further able to accept ongoing client tuning.

Our particular brand of smart agents results from the preoperational data mining of transaction records which can recognize the many actors and entities behind payment transactions and their individual characteristic behaviors. For example, the merchants. These can be effectively understood in their essential aspects by way of the attributes reported in each transaction they initiate over time.

Figure 3:
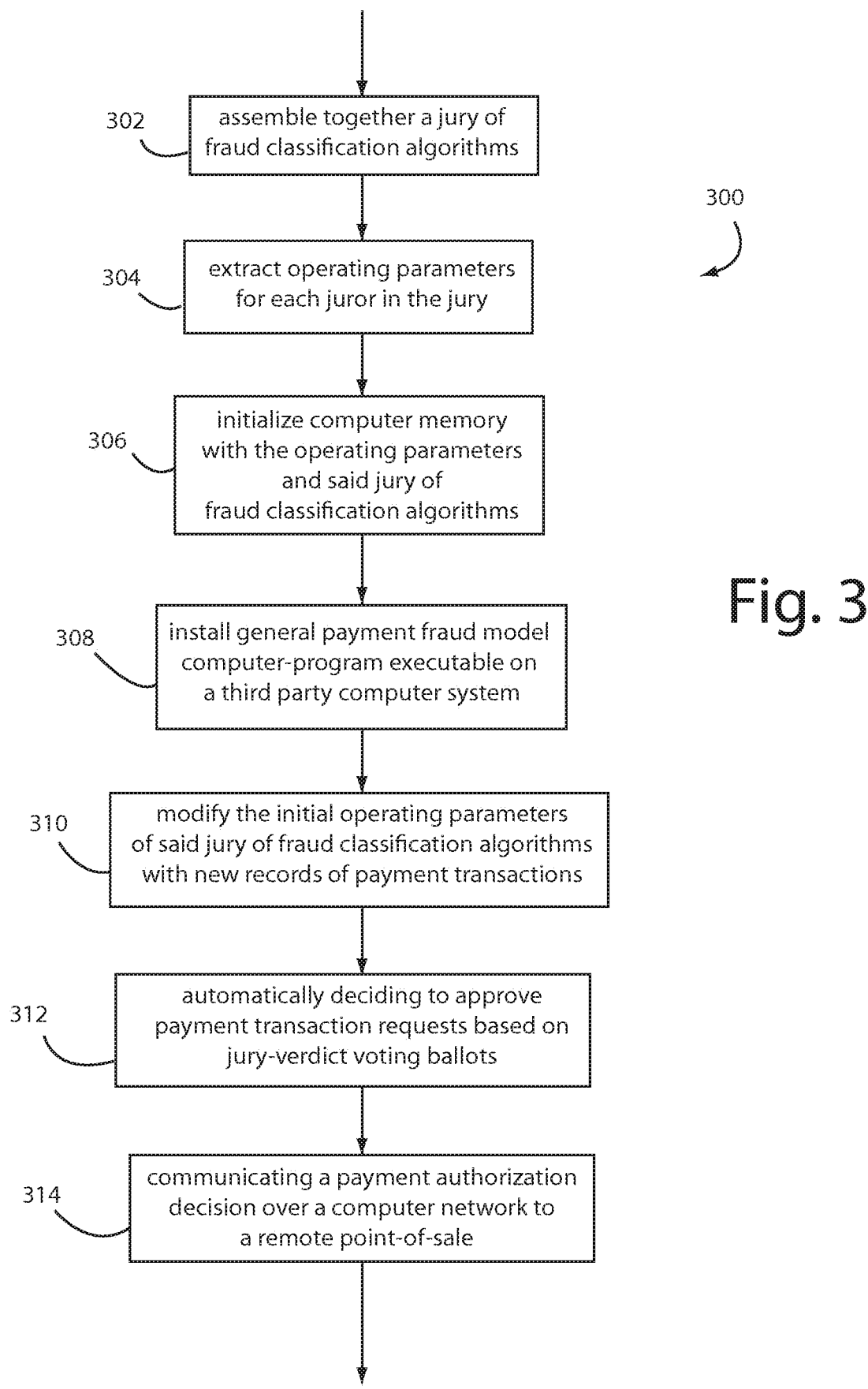
FIG. 3 is diagram illustrating the steps of the method for empaneling a jury of fraud classification algorithms that are included in the method of FIG. 1.

Occasionally each legitimate cardholder will step way out-of-character and generate a transaction that looks suspicious or downright fraudulent. Often such transactions can be forecast by previous such outbursts that they or their peers engaged in. FIG. 3 represents a method 300 of automation tool development for building general computer fraud management applications for third parties.

Figure 2:
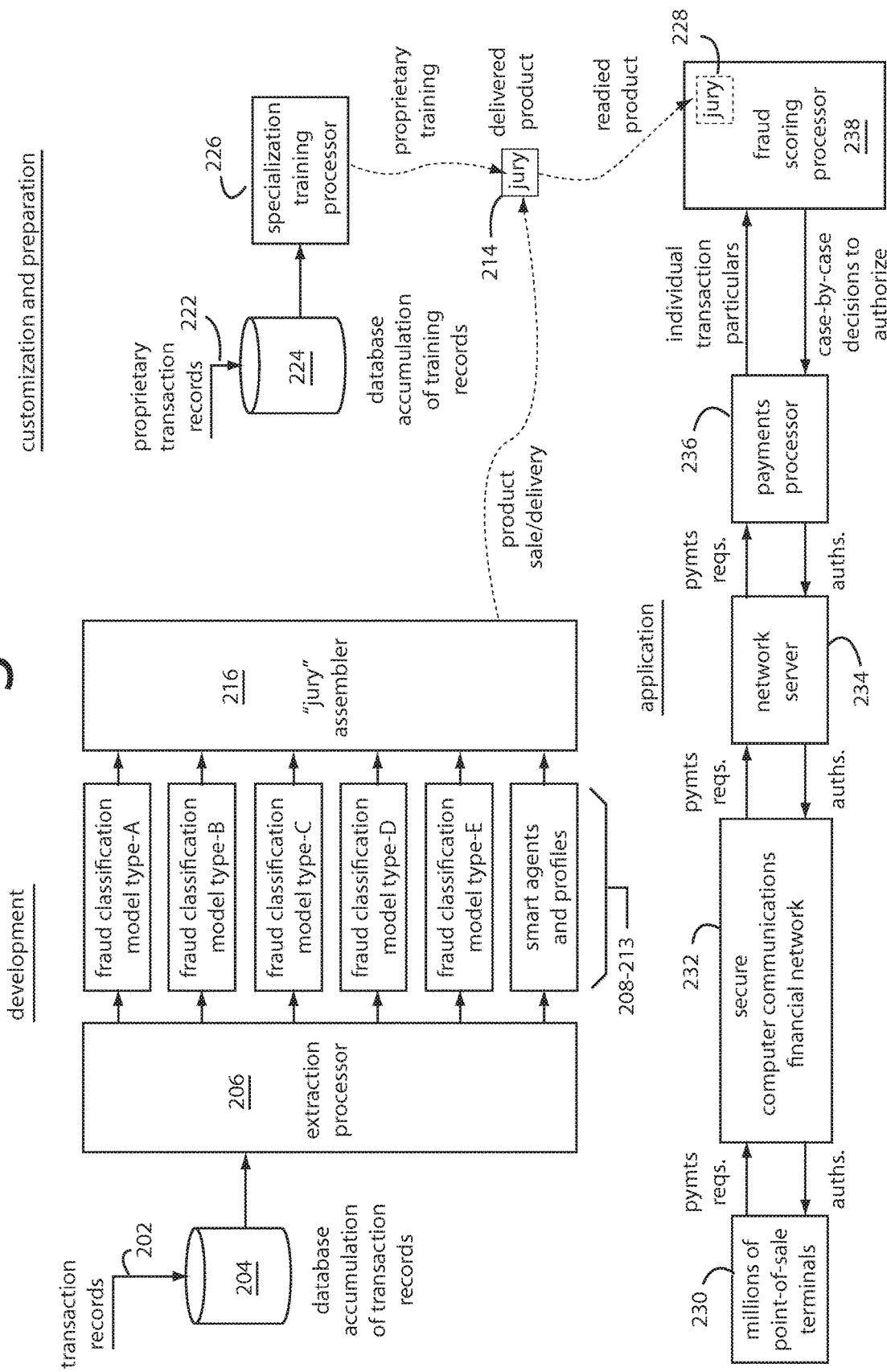
FIG. 2 is a functional block diagram of the equipment needed to perform the steps of the method of FIG. 1.

FIG. 2 illustrates the computer and network machinery required to implement the Method of FIG. 1. There are three phases of development, customization/preparation, and application involved that occur one after the other and in that order. In the development phase, historical transaction records 202 of a plurality of financial institutions are "poured" into a database 204 that accumulates and stores these records. A computer and operator console 206 are programmed to extract fraud classification parameters for several different classification algorithms 208-213 in parallel from the same collection points provided by database 204.

These classification algorithms 208-213 and their respective fraud classification parameters are bound together into a general purpose "jury" device 214 by a computer program compiler, jury assembler 216.

Jury device 214 is a transportable computer program record that is embodied on a disk, a tape, a file, a data packet, etc. It is also the tangible thing that can be advertised, marketed, sold, delivered, and installed on a third party computer data processing method.

A second phase, customization and preparation, occurs at a secure end user location. There, a proprietary transaction record file 220 is used to build an accumulation of training records in a database 222. A specialization training processor 224 n a data processing method fine-tunes the parameters embedded in jury device 214 according to the end users' own experiences and preferences. A fully operational and ready-to-use jury device 228 is then used in the third phase.

A third phase is the application and real-time use. In a conventional financial payment method that allows shoppers to use credit cards, debit cards, and other payment cards, millions of point-of-sale (POS) terminals 230 collect card-present and card-not-present account information and make payment requests in secure messages carried in data packets over computer networks. For example, a secure computer communications financial network 232. These payment requests are all forwarded by a network server 234 to payments processor 236. The individual transaction particulars are sent by network data packets to a fraud scoring processor 236. Such is expected to return a payment authorization quickly, within milliseconds back to POS 230. A credit card issuer and payments processing business is highly dependent on how well a job is done by the fraud scoring processor 238.

The method of FIG. 3 and the computer hardware used to produce ready-to-use jury device 228 will improve business profits by reducing losses due to fraud, transactions that, should have been denied, and lost revenues, sales losses due to transactions that were denied but were in fact legitimate or advantageous.

The ready-to-use jury device 223 is therefore installed in toe end users' applications and run daily.

Referring now to FIG. 3, in a method 300, a step 302 uses a computer development method to assemble together what constitutes a "jury" of "jurors" that will all be later connected together in parallel to receive the same payment transaction information data from a network, transaction-by-transaction. But each such juror will come to their own conclusions and fraud classifications, respectively, according to their unique artificial intelligence (AI) talents, skills, experience, and abilities to learn. Not unlike how human juries function in courtrooms, but here, millions of "verdicts" per second are the norm. Computer servers and networks are therefore necessary to implement these methods.

Each such AI juror resembles, in computer data processing terms, a traditional classification technology in algorithm form, and the spectrum includes decision trees, case-based reasoning, neural networks, genetic algorithms, etc. These jurors are joined by a vary special juror, the present inventor's own unique "smart agent" AI algorithms that spawn and assign an individual smart agent to every actor, entity, or thing discernible from preoperational data mining of past payment transaction records.

These smart agents are relied on in the method to track, follow, and profile the short-term, long-term, and recursive payment-transaction behaviors of each actor, entity, or thing found in the data mining. And then to develop a computed statistic, or abstract, of the mean behavior. New behavior observations can be matched to these profiles as templates to discern instances of out-of-character behavior, and probable fraud.

"False positives" occur when any fraud automation gets it wrong, e.g., a legitimate transaction is blocked as being fraudulent. False negatives can also be damaging to a business because real fraud was able to hide from detection.

A step 304 uses a data-mining computer especially programmed to extract, in parallel, initial sets of operating parameters from millions of instances of transactions previously processed. Each juror in a jury of fraud classification algorithms reads from the same historical record of payment transactions.

A step 306 initializes addresses in a non-volatile programmable computer memory with several of the initial sets of operating parameters, together with corresponding computer implementations of the jury of fraud classification algorithms, to produce a commercially deliverable and trainable general payment fraud algorithm computer-program executable that is then operable on a third party computer method.

A step 303 is installing the general payment fraud algorithm computer-program executable onto a third party computer method.

A step 310 is modifying the memory programming of the initial sets of operating parameters with data obtained from records of payment transactions processed for payment authorization requests received by the third party computer method.

A step 312 is automatically deciding with a classification algorithm whether to approve individual payment, authorization requests received by the third party computer method based on a jury-verdict ballot by each of the jury of fraud classification algorithms operating within and each respectively using modified sets of the initial operating parameters.

And a step 314 is communicating a payment authorization decision over a computer network to a remote point-of-sale.

Incremental learning technologies are embedded in the machine algorithms and smart-agent technology to continually re-train from any false positives and negatives that occur along the way. Each corrects itself to avoid repeating the same classification errors. Data mining logic incrementally changes the decision trees by creating a new link or updating the existing links and weights. Neural networks update the weight matrix, and case based reasoning logic updates generic cases or creates new ones. Smart-agents update their profiles by adjusting the normal/abnormal thresholds, or by creating exceptions.

In general, embodiments of the present invention deliver an automation tool for the application development of multi-discipline artificial intelligence fraud management systems. An expert programmer development method with tools and software libraries is used for building trainable general payment fraud algorithms that are constructed of and integrate several artificial intelligence classifiers, including smart agents, neural networks, case-based reasoning, decision trees, and business rules. The trainable general payment fraud algorithms are capable of being trained with historical transaction data that causes an initial population of smart agents and associated profiles to be generated, and an initial set of neural networks to assume a beginning weight matrix, and an initial decision tree to be structured from data mining logic, and an initial case-based reasoning set to be structured, and an initial set of business rules to be fixed. These trainable general payment fraud algorithms are detachable and deliverable to third parties once built.

An incremental learning technology is embedded in a run-time machine algorithm and smart-agent technology that is able to continually re-train the artificial intelligence classifiers using feedback, e.g., false positives and negatives that occur during use.

Data mining logic is leveraged to incrementally change the initial decision trees by creating new links or updating their existing links and weights. Feedback also is helpful for the initial neural networks to have their weight matrices updated, and for the initial case-based reasoning logic to update its generic cases or to create new ones. The initial population of smart-agents are enabled to self-update their profiles and to adjust their normal/abnormal thresholds or by creating exceptions.

The unique and novel technology of the present inventor, Dr. Akli Adjaoute, and his Company, Brighterion, Incorporated (San Francisco, Calif.), is to integrate several different traditional classification algorithms into a "jury" in which each "juror" hears the same evidence but arrives at their respective verdicts from their unique perspectives. A majority vote would be one way to reach a "verdict", but here the respective qualifications of the individual jurors can be analyzed and weighed into a final verdict of "payment fraud" or no fraud. The verdict determines whether the payment request is approved or declined.

At the most elementary level, each smart agent begins as a list of transactions for the corresponding actor or entity that were sorted from the general inflow of transactions. Each list becomes a profile and various velocity counts are pre-computed to make later real-time access more efficient and less burdensome. For example, a running total of the transactions is maintained as an attribute datapoint, as are the minimums, maximums, and averages of the dollar amounts of all long term or short term transactions. The frequency of those transactions per atomic time interval is also preprocessed and instantly available in any time interval. The frequencies of zipcodes involved in transactions is another velocity count. The radius of those zipcodes around the cardholders home zipcode can be another velocity count from a pre-computation.

So, each smart agent is a two-dimensional thing in virtual memory expressing attributes and velocity counts in its width and time intervals and constituent transactions in its length. As time moves to the next interval, the time intervals in every smart agent are effectively shift registered ad pushed down.

The smart agent profiles can be data mined for purchasing patterns, e.g., airline ticket purchases are always associated with car rentals and hotel charges. Concert ticket venues are associated with high end restaurants and bar bills. These patterns can form behavioral clusters useful in forecasting.

Figure 4:
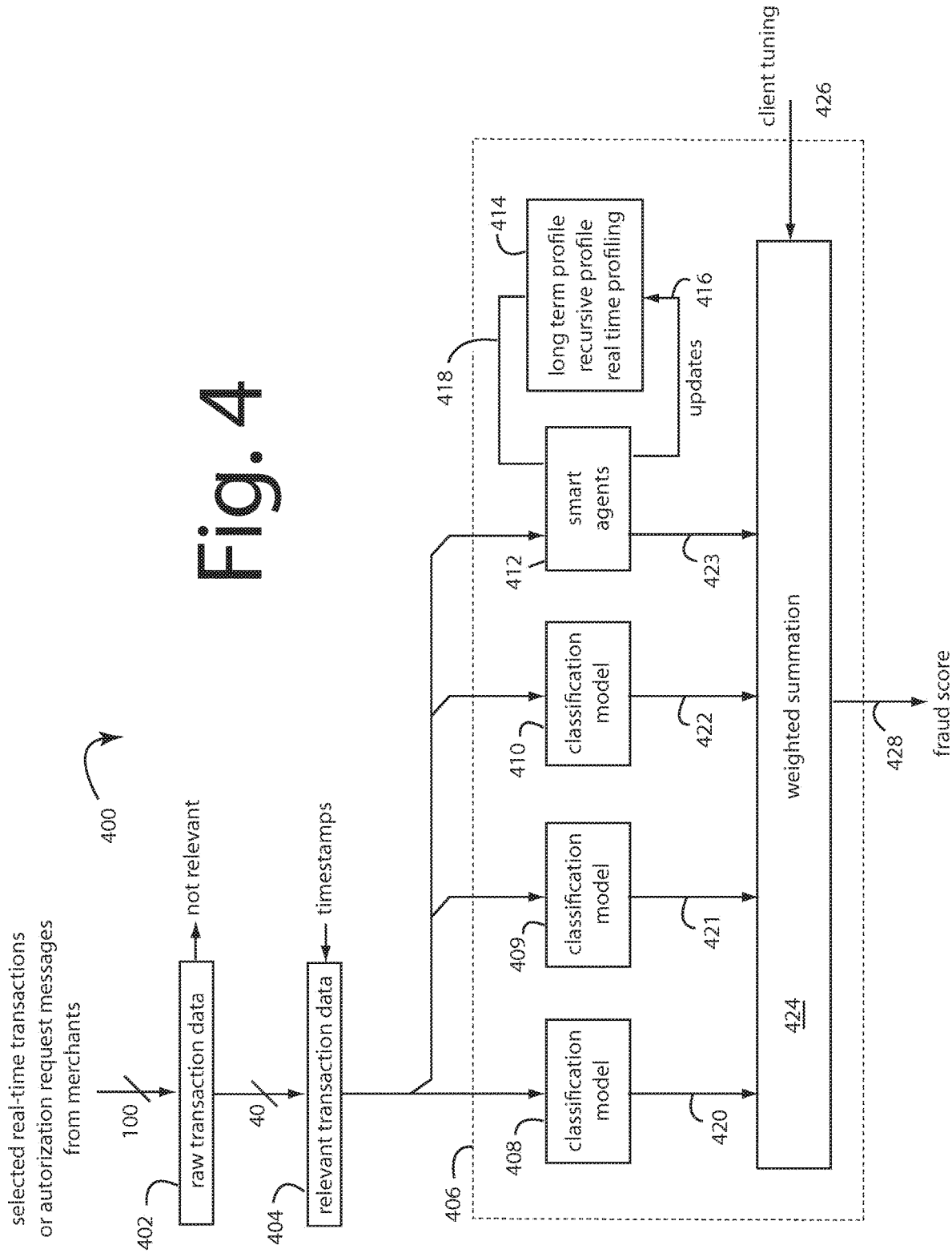
FIG. 4 is functional block diagram of a real-time payment fraud management system as an applied payment fraud model.

FIG. 4 represents a real-time payment fraud management method 409. A raw transaction separator 402 filters through the forty or so data items that are relevant to the computing of a fraud verdict. A method 494 adds timestamps to these relevant datapoints and passes them in parallel to a selected applied fraud algorithm 406. This is equivalent to a selected one of applied fraud algorithms 316-323 in FIG. 3 and applied payment fraud algorithm 114 in FIG. 1.

During a session in which the time-stamped relevant transaction data flows in, a set of classification algorithms 408-410 operate independently according to their respective natures. A population of smart agents 412 and profilers 414 also operate on the time-stamped relevant transaction data inflows. Each new line of time-stamped relevant transaction data will trigger an update 416 of the respective profilers 414. Their attributes 418 are provided no the population of smart agents 412.

The classification algorithms 408-410 and population of smart agents 412 and profilers 414 all each produce an independent end separate vote or fraud verdict 420-423 on the same line of time-stamped relevant transaction data. A weighted summation processor 424 responds to client tunings 426 to output a final fraud verdict 428.

Figure 5:
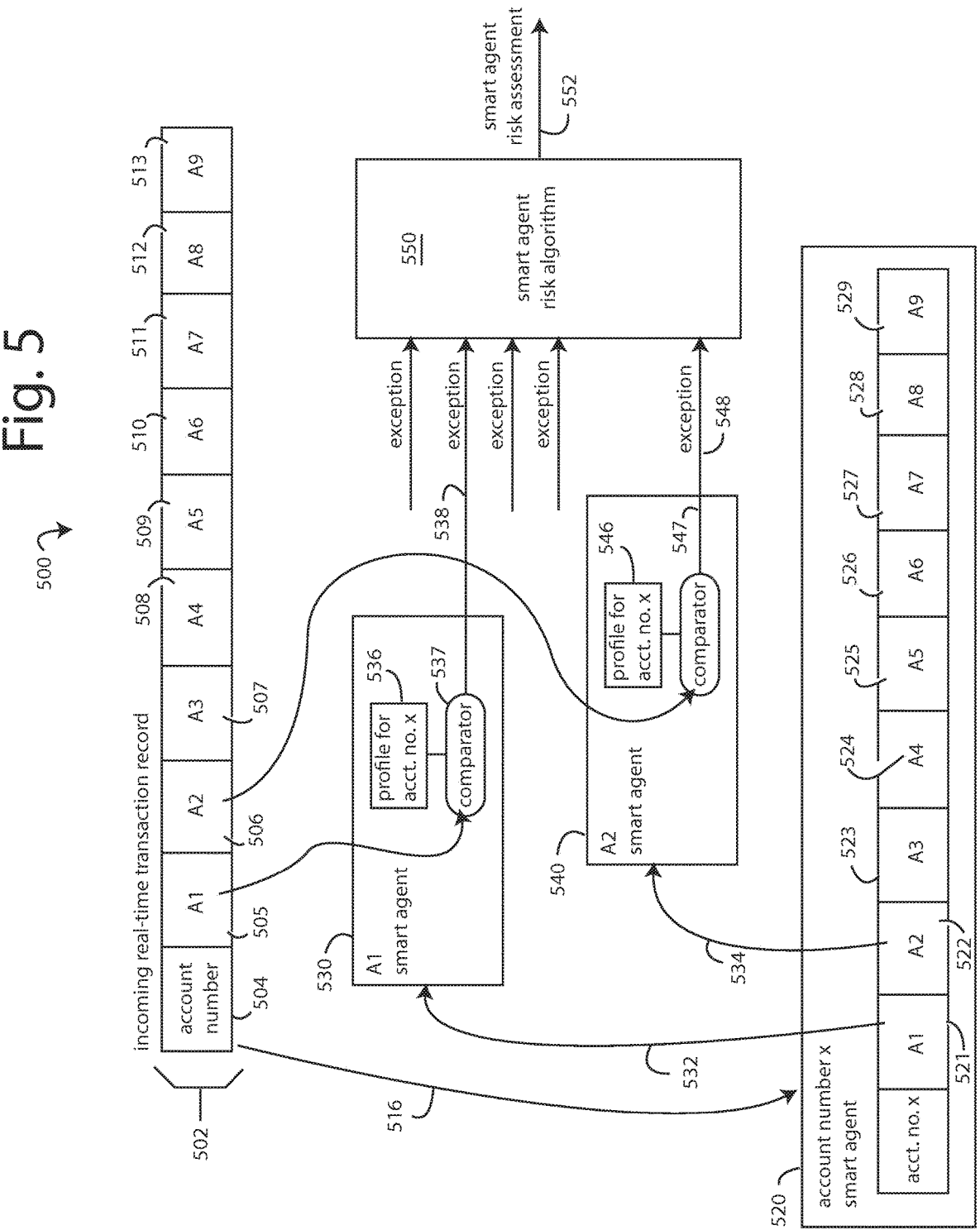
FIG. 5 is functional block diagram of a smart agent process embodiment of the present invention.

FIG. 5 represents a smart agent method 500 in an embodiment of the present invention. For example, these would include the smart agent population build 334 and profiles 336 in FIG. 3 and smart, agents 412 and profiles 414 in FIG. 4. A series of payment card transactions arriving in real-time in an authorization request message is represented here by a random instantaneous incoming real-time transaction record 502.

Such record 502 begins with an account number 504. It includes attributes A1-A9 numbered 505-513 here. These attributes, in the context of a payment card fraud application would include datapoints for card type, transaction type, merchant name, merchant category code (MCC), transaction amount, time of transaction, time of processing, etc.

Account number 504 in record 502 will issue a trigger 516 to a corresponding smart agent 520 to present itself for action. Smart agent 520 is simply a constitution of its attributes, again A1-A8 and numbered 521-529 in FIG. 5. These attributes A1-A9 521-529 are merely pointers to attribute smart agents. Two of these, one for A1 and one for A2, are represented in FIG. 5. Hero, an A1 smart agent 530 and an A2 smart agent 540. These are respectively called into action by triggers 532 and 542.

A1 smart agent 530 and A2 smart agent 540 will respectively fetch correspondent attributes 505 and 506 from incoming real-time transaction record 502. Smart agents for A3-A9 make similar fetches to themselves in parallel. They are not shown here to reduce the clutter for FIG. 5 that would otherwise result.

Each attribute smart agent like 530 and 540 will include or access a corresponding profile datapoint 536 and 546. This is actually a simplification of the three kinds of profiles 336 (FIG. 3) that were originally built during training and updated in update 416 (FIG. 4). These profiles are used to track what is "normal" behavior for the particular account number for the particular single attribute.

For example, if one of the attributes reports the MCC's of the merchants and another reports the transaction amounts, then if the long-term, recursive, and real time profiles for a particular account number x shows a pattern of purchases at the local Home Depot and Costco that average $100-$300, then an instantaneous incoming real-time transaction record 502 that reports another $200 purchase at the local Costco will raise no alarms. But a sudden, unique, inexplicable purchase for $1250 at a New York Jeweler will and should threw more than one exception.

Each attribute smart agent like 530 and 540 will further include a comparator 537 and 547 that will be able to compare the corresponding attribute in the instantaneous incoming real-time transaction record 502 for account number x with the same attributes held by the profiles for the same account. Comparators 537 and 347 should accept some slack, but not too much. Each can throw an exception 538 and 546, as can the comparators in all the other attribute smart agents. It may be useful for the exceptions to be a fuzzy value, e.g., an analog signal 0.0 to 3.0. Or it could foe a simple binary one or zero. What sort of excursions should trigger an exception is preferably adjustable, for example with client tunings 426 in FIG. 4.

These exceptions are collected by a smart agent risk algorithm 550. One deviation or exception thrown on any one attribute being "abnormal" can be tolerated if not too egregious. But two or more should be weighted more than just the simple sum, e.g., $(1+1)''=2''$ instead of simply $1+1=2$. The product is output as a smart agent risk assessment 552. This output is the equivalent of independent and separate vote or fraud verdict 423 in FIG. 4.

Figure 6:
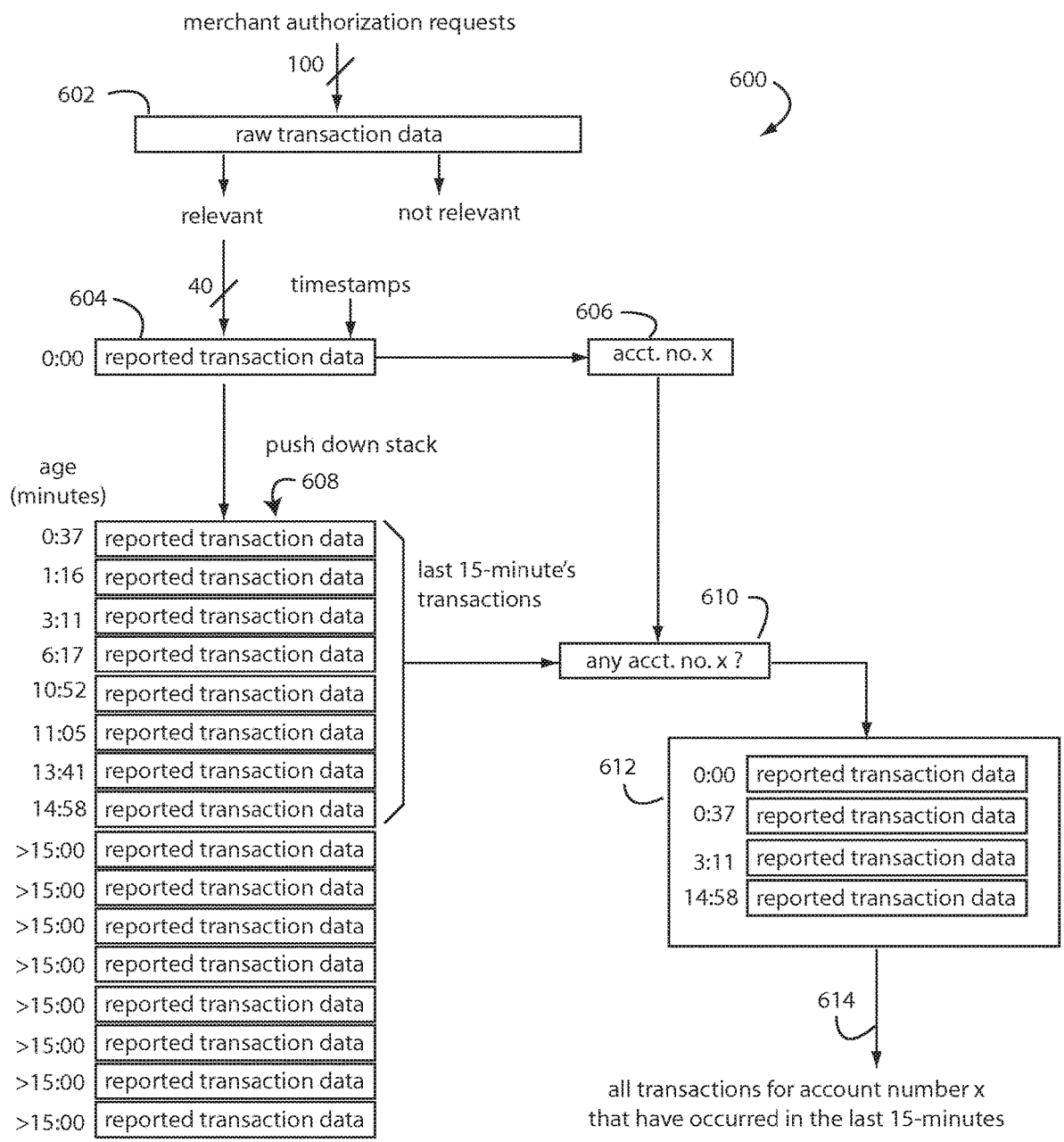
FIG. 6 is functional block diagram of a most recent fifteen-minute transaction velocity counter.

FIG. 6 represents a most recent 15-minute transaction velocity counter 600, in an embodiment of the present invention. It receives the same kind of real-time transaction data inputs as were described in connection with FIG. 4 as raw transaction data 492 and FIG. 5 as records 502. A raw transaction record 602 includes a hundred or so datapoints. About forty of those datapoints are relevant to fraud detection an identified in FIG. 6 as reported transaction data 604.

The reported transaction data 604 arrive in a time series and randomly involve a variety of active account numbers. But, let's say the most current reported transaction data 604 with a time age of 0:00 concerns a particular account number x. That fills a register 606.

Earlier arriving reported transaction data 604 build a transaction time-series stack 608. FIG. 6 arbitrarily identifies the respective ages of members of transaction time-series stack 608 with example ages 0:73, 1:16, 3:11, 6:17, 10:52, 11:05, 13:41, and 14:53. Those aged more than 15-minutes are simply identified with aces ">15:00". This embodiment of the present invention is concerned with only the last 15-minutes worth of transactions. As time passes transaction time-series stack 608 pushes down.

The key concern is whether account number x has been involved in any other transactions in the last 15-minutes. A search method 61C accepts a search key from register 606 and reports any matches in the most 15-minute window with an account activity velocity counter 612. Too much very recent activity can hint there is a fraudster at work, or it may be normal behavior. A trigger 614 is issued that can be fed to an additional attribute smart agent that is included with attributes smart agents 530 and 540 and the others in parallel. Exception from this new account activity velocity counter smart agent is input to smart agent risk algorithm 550 in FIG. 5.

Figure 7:
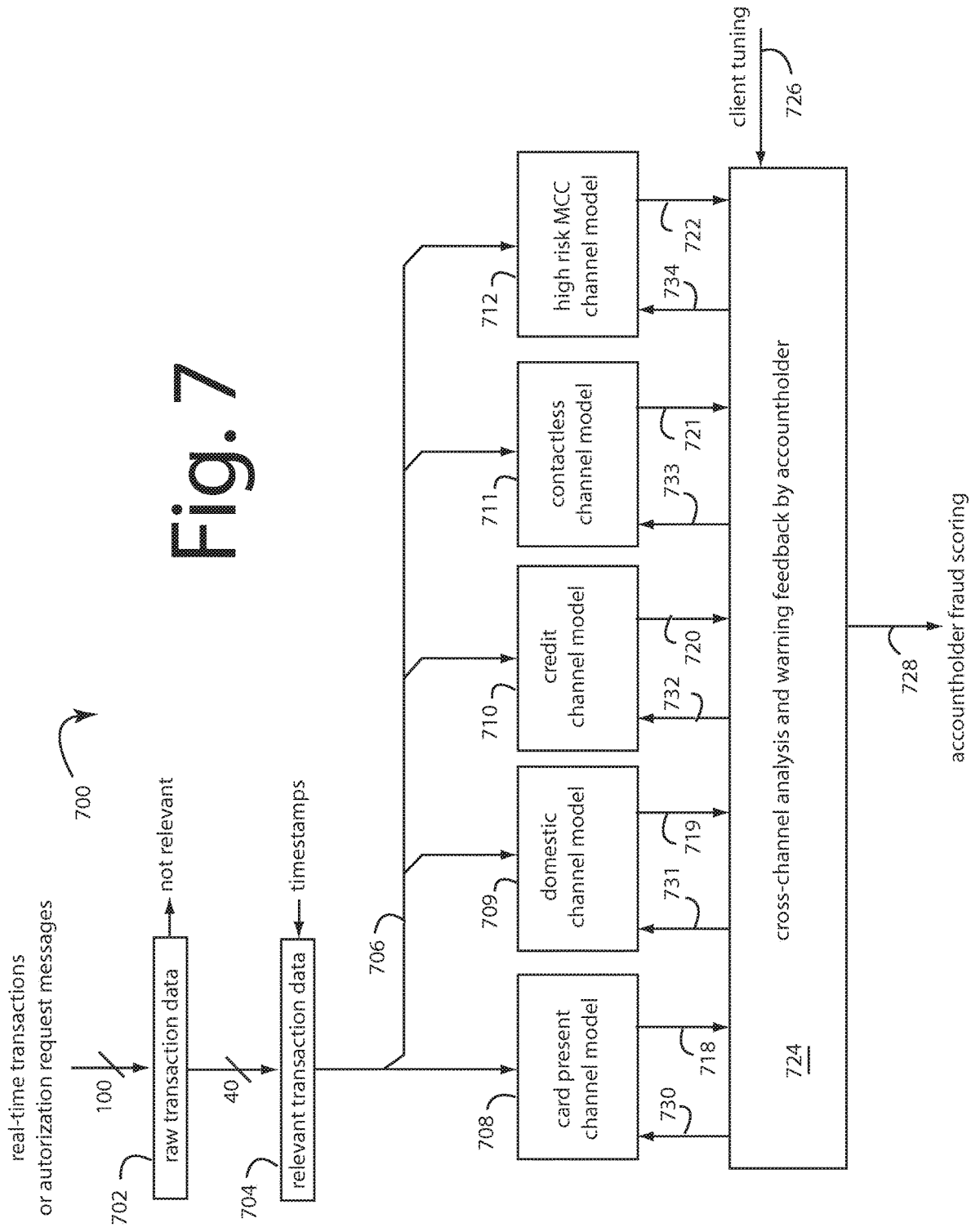
FIG. 7 is functional block diagram of a cross-channel payment fraud management embodiment of the present invention.

FIG. 7 represents a cross-channel payment fraud management embodiment of the present, invention, and is referred to herein by general reference numeral 700.

Real-time cross-channel monitoring uses track cross channel and cross product patterns to cross pollinate information for more accurate decisions. Such track not only the channel where the fraud ends but also the initiating channel to deliver a holistic fraud monitoring. A standalone internet banking fraud solution will allow a transaction if it is within its limits, however if core banking is in picture, then it will stop this transaction, as we additionally know the source of funding of this account (which mostly in missing in internet banking).

In FIG. 3, a variety of selected applied fraud algorithms 316-323 represent the applied fraud algorithms 114 that result with different settings of filter switch 306. A real-time cross-channel monitoring payment network server can be constructed by running several of these selected applied fraud algorithms 316-323 in parallel.

FIG. 7 represents a real-time cross-channel monitoring payment network server 700, in an embodiment of the present invention. Each customer or accountholder of a financial institution can have several very different kinds of accounts and use them in very different transactional channels. For example, card-present, domestic, credit card, contactless. So in order for a cross-channel fraud detection method to work at its best, all the transaction data from all the channels is funneled into one pipe for analysis.

Real-time transactions and authorization requests data is input and stripped of irrelevant datapoints by a method 702. The resulting relevant data is time-stamped in a method 704. The 15-minute vector method of FIG. 6 may be engaged at this point in background. A bus 706 feeds the data in parallel line-by-line, e.g., to a selected applied fraud channel algorithm for card present 708, domestic 709, credit 710, contactless 711, and high risk MCC 712. Each can pop an exception to the current line input data with an evaluation flag or verdict 718-722. The involved accountholder is understood.

These exceptions are collected and analyzed by a method 724 that can issue alert feedback for the profiles maintained for each accountholder. Each selected applied fraud channel algorithm 708-712 shares risk information about particular accountholders with the other selected applied fraud algorithms 708-712. A suspicious or outright fraudulent transaction detected by a first selected applied fraud channel algorithm 708-712 for a particular customer in one channel is cause for a risk adjustment for that same customer in all the other applied fraud algorithms for the other channels.

Exceptions 718-722 to an instant transactions on bus 706 trigger an automated examination of the customer or accountholder involved in a profiling method 724, especially with respect to the 15-minute vectors and activity in the other channels for the instant accountholder. A client tuning input 726 will affect, an ultimate accountholder fraud scoring output 723, e.g., by changing the respective risk thresholds for genuine-suspicious-fraudulent.

A corresponding set of alert triggers 73-734 is fed back to all the applied fraud channel algorithms 708-712. The compromised accountholder result 728 can be expected to be a highly accurate and early protection alert.

In general, a method for cross-channel financial fraud protection comprises training a variety of real-time, risk-scoring fraud algorithms with training data selected for each from a common transaction history to specialize each member in the monitoring of a selected channel. Then arranging the variety of real-time, risk-scoring fraud algorithms after the training into a parallel arrangement so that all receive a mixed channel flow of real-time transaction data or authorization requests. The parallel arrangement of diversity trained real-time, risk-scoring fraud algorithms is hosted on a network server platform for real-time risk scoring of the mixed channel flow of real-time transaction data or authorization, requests. Risk thresholds are immediately updated for particular accountholders in every member of the parallel arrangement of diversity trained real-time, risk-scoring fraud algorithms when any one of them detects a suspicious or outright fraudulent transaction data or authorization request for the accountholder. So, a compromise, takeover, or suspicious activity of the account holder's account in any one channel is thereafter prevented from being employed to perpetrate a fraud in any of the other channels.

Such method for cross-channel financial fraud protection can further comprise steps for building a population of real-time and a long-term and a recursive profile for each the accountholder in each the real-time, risk-scoring fraud algorithms. Then during real-time use, maintaining and updating the real time, long-term, and recursive profiles for each accountholder in each and all of the real-time, risk-scoring fraud algorithms with newly arriving data. If during real-time use a compromise, takeover, or suspicious activity of the accountholder's account in any one channel is detected, then updating the real-time, long-term, and recursive profiles for each accountholder in each and all of the other real-time, risk-scoring fraud algorithms to further include an elevated risk flag. The elevated risk flags are included in a final risk verdict calculation 728 for the current transaction or authorization request.

The 15-minute vectors described in FIG. 6 are a way to cross pollinate risks calculated in one channel with the others. The 15-minute vectors can represent an amalgamation of transactions in all channels, or channel-by channel. Once a 15-minute vector has aged, it can be shifted into a 30-minute vector, a one-hour vector, and a whole day vector by a simple shift register means. These vectors represent velocity counts that can be very effective in catching fraud as it is occurring in real time.

In every case, embodiments of the present invention include adaptive learning that combines three learning techniques to evolve the artificial intelligence classifiers, e.g., 408-414. First is the automatic creation of profiles, or smart-agents, from historical data, e.g., long-term profiling. See FIG. 3. The second is real-time learning, e.g., enrichment of the smart-agents based on real-time activities. See FIG. 4. The third is adaptive learning carried by incremental learning algorithms. See FIG. 7.

For example, two years of historical credit card transactions data needed over twenty seven terabytes of database storage. A smart-agent is created for each individual card in that data in a first learning step, e.g., long-term profiling. Each profile is created from the card's activities and transactions that took place over the two year period. Each profile for each smart-agent comprises knowledge extracted field-by-field, such as merchant category code (MCC), time, amount for an mcc over a period of time, recursive profiling, zip codes, type of merchant, monthly aggregation, activity during the week, weekend, holidays. Card not present (CNP) versus card present (CP), domestic versos cross-border, etc. this profile will highlights all the normal activities of the smart-agent (specific card).

Smart-agent technology has been observed to outperform conventional artificial, and machine learning technologies. For example, data mining technology creates a decision tree from historical data. When historical data is applied to data mining algorithms, the result is a decision tree. Decision tree logic can be used to detect fraud In credit card transactions. But, there are limits to data mining technology. The first is data mining can only learn from historical data and it generates decision tree logic that applies to all the cardholders as a group. The same logic is applied to all cardholders even though each merchant may have a unique activity pattern and each cardholder may have a unique spending pattern.

A second limitation is decision trees become immediately outdated. Fraud schemes continue to evolve, but the decision tree was fixed with examples that do not contain new fraud schemes. So stagnant non-adapting decision trees will fail to detect new types of fraud, and do not have the ability to respond to the highly volatile nature of fraud.

Another technology widely used is "business rules" which requires actual business experts to write the rules, e.g., if-then-else logic. The most important limitations here are that the business rules require writing rules that are supposed to work for whole categories of customers. This requires the population to be sliced into many categories (students, seniors, rip codes, etc.) and asks the experts to provide rules that apply to all the cardholders of a category.

How could the US population be sliced? Even worse, why would all the cardholders in a category all have the same behavior? It is plain that business rules logic has built-in limits, and poor detection rates with nigh false positives. What should also be obvious is the rules are outdated as soon as they are written because conventionally they don't adapt at all to new fraud schemes or data shifts.

Neural network technology also limits, it uses historical data to create a matrix weights for future data classification. The Neural network will use as input (first layer) the historical transactions and the classification for fraud or not as an output). Neural Networks only learn from past transactions and cannot detect any new fraud schemes (that arise daily) if the neural network was not re-trained with this type of fraud. Same as data mining and business rules the classification logic learned from the historical data will be applied to all the cardholders even though each merchant has a unique activity pattern and each cardholder has a unique spending pattern.

Another limit is the classification logic learned from historical data as outdated the same day of its use because the fraud schemes changes but since the neural network did not learn with examples that contain this new type of fraud schemes, it will fail to detect this new type of fraud it lacks the ability to adapt to new fraud schemes and do not have the ability to respond to the highly volatile nature of fraud.

Contrary to previous technologies, smart-agent technology learns the specific behaviors of each cardholder and create a smart-agent that follow the behavior of each cardholder. Because it learns from each activity of a cardholder, the smart-agent updates the profiles and makes effective changes at runtime. It is the only technology with an ability to identify and stop, in real-time, previously unknown fraud schemes. It has the highest detection rate and lowest false positives because it separately follows and learns the behaviors of each cardholder.

Smart-agents have a further advantage in data size reduction. Once, say twenty-seven terabytes of historical data is transformed into smart-agents, only 200-gigabytes is needed to represent twenty-seven million distinct smart-agents corresponding to ell the distinct cardholders.

Incremental learning technologies are embedded in the machine algorithms and smart-agent technology to continually re-train from any false positives and negatives that occur along the way. Each corrects itself to avoid repeating the same classification errors. Data mining logic incrementally changes the decision trees by creating a new link or updating the existing links and weights. Neural networks update the weight matrix, and case based reasoning logic updates generic cases or creates new ones. Smart-agents update their profiles by adjusting the normal/abnormal thresholds, or by creating exceptions.

In real-time behavioral profiling by the smart-agents, both the real-time and long-term engines require high speed transfers and lots of processor attention. Conventional database systems cannot provide the transfer speeds necessary, and the processing burdens cannot be tolerated.

Embodiments of the present invention include a fast, low overhead, custom file format and storage engine designed to retrieve profiles in real-time with a constant low load and save time. For example, the profiles 336 built in FIG. 3, and long-term, recursive, and real-time profiles 414 in FIG. 4.

Figure 8:
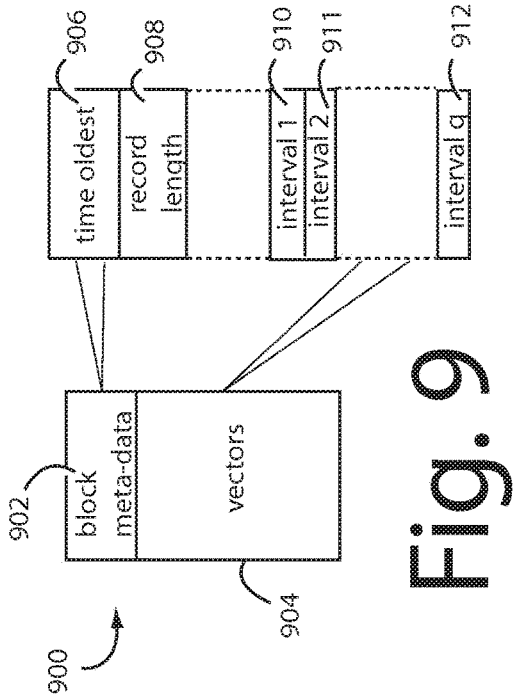
FIG. 8 is a diagram of a group of smart agent profiles stored in a custom binary file.

Referring now to FIG. 8, a group of smart agent profiles is stored in a custom binary file 800 which starts with a meta-data section 802 containing a profile definition, and a number of fixed size profile blocks, e.g., 804, 805, . . . 806 each containing the respective profiles. Such profiles are individually reserved to and used by a corresponding smart agent, e.g., profile 536 and smart agent 530 in FIG. 5. Fast file access to the profiles is needed on the arrival of every transaction 502. In FIG. 5, account number 504 signals the particular smart agents and profiles to access and that are required to provide a smart agent risk assessment 552 in real-time. For example, an approval or a denial in response to an authorization request message.

Figure 9:
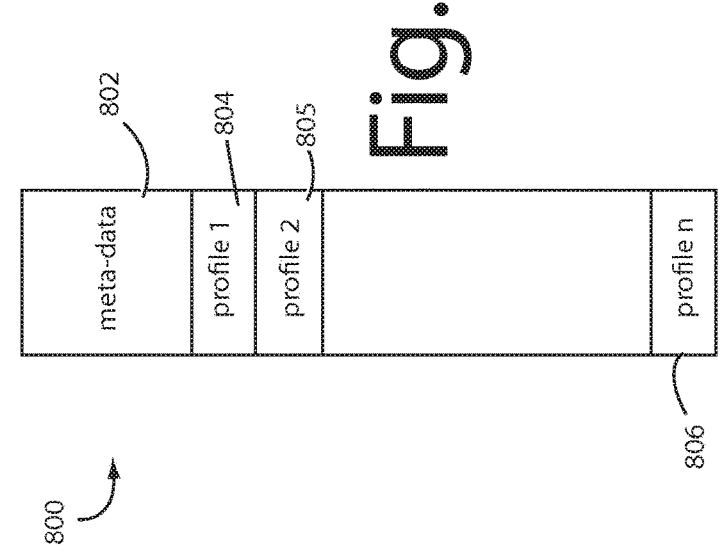
FIG. 9 is a diagram of the file contents of an exemplary smart agent profile.

FIG. 9 represents what's inside each such profile, e.g., a profile 900 includes a meta-data 902 and a rolling list of vectors 904. The meta-data 902 comprises the oldest one's time field 906, and a record length field 908. Transaction events are timestamped, recorded, and indexed by a specified atomic interval, e.g., ten minute intervals are typical, which is six hundred seconds. Each vector points to a run of profile datapoints that all share the same time interval, e.g., intervals 910-912. Some intervals will have no events, and therefore no vectors 904. Here, all the time intervals less than ninety days old are considered by the real-time (RT) profiles. Ones older than that are amalgamated into the respective long-term (LT) profiles.

What was purchased and how long ago a transaction for a particular accountholder occurred, and when their other recent transactions occurred can provide valuable insights into whether the transactions the accountholder is presently engaging in are normal and in character, or deviating. Forcing a fraud management and protection method to hunt a conventional database for every transaction a particular random accountholder engaged in is not practical. The account holders' transactions must be pre-organized into their respective profiles so they are always randomly available for instant calculations. How that is made possible in embodiments of the present invention is illustrated here in FIGS. 5, 6, and 8-10.

Figure 10:
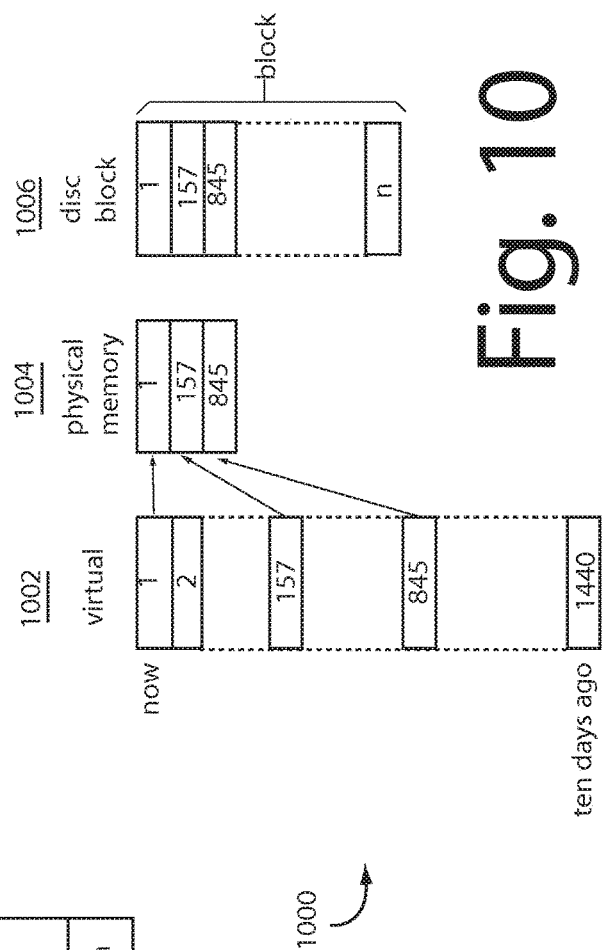
FIG. 10 is a diagram of a virtual addressing scheme used to access transactions in atomic time intervals by their smart agent profile vectors.

FIG. 10 illustrates a virtual memory method 1000 in which a virtual address representation 1002 is translated into a physical memory address 1004, and/or a disk block address 1006.

Profiling herein looks at events that occurred over a specific span of time. Any vectors that were assigned to events older than that are retired and made available for re-assignment to new events as they are added to the beginning of the list.

The following pseudo-code examples represent how smart agents (e.g., 412, 550) lookup profiles and make behavior deviation computations. A first step when a new transaction (e.g., 502) arrives is to find the one profile it should be directed to in the memory or filing method.

```
find_profile ( T: transaction, PT : Profile's Type )
Begin
    Extract the value from T for each key used in the routing logic for PT
    Combine the values from each key into PK
    Search for PK in the in-memory index
    If found, load the profile in the file of type PT based on the indexed
    position.
    Else, this is a new element without a profile of type PT yet.
End
```

If the profile is not a new one, then it can be updated, otherwise a new one has to be created.

```
update_profile ( T: transaction, PT : Profile's Type )
Begin
    find_profile of type PT P associated to T
    Deduce the timestamp t associated to T
    If P is empty, then add a new record based on the atomic interval for
    t
    Else locate the record to update based on t
        If there is no record associated to t yet,
        Then add a new record based on the atomic interval for t
    For each datapoint in the profile, update the record with the values in
    T (by increasing a count, sum, deducing a new minimum, maximum
    ...).
    Save the update to disk
End
```

```
compute_profile ( T: transaction, PT : Profile's Type )
Begin
    update_profile P of type PT with T
    Deduce the timestamp t associated to T
    For each datapoint DP in the profile,
        Initialize the counter C
        For each record R in the profile P
            If the timestamp t associated to R belongs to the span of time for
            DP
            Then update C with the value of DP in the record R (by
                increasing a count, sum, deducing a new minimum,
                maximum ...)
        End For
    End For
    Return the values for each counter C
End
```

```
compute_profile ( T: transaction, PT : Profile's Type )
Begin
    update_profile P of type PT with T
    Deduce the timestamp t associated to T
    For each datapoint DP in the profile,
        Initialize the counter C
        For each record R in the profile P
            If the timestamp t associated to R belongs to the span of time for
            DR
            Then update C with the value of DB in the record R (by
                increasing a count, sum, deducing a new minimum,
                maximum ...)
        End For
    End For
    Return the values for each counter C
End
```

The entity's behavior in the instant transaction is then analyzed to determine if the real-time (RT) behavior is out of the norm defined in the corresponding long-term (LT) profile. If a threshold (T) is exceeded, the transaction risk verdict is incremented.

```
analyze_entity_behavior ( T: transaction )
Begin
    Get the real-time profile RT by calling compute_profile( T,
    real-time )
    Get the long-term profile LT by calling compute_profile( T,
    long-term )
    Analyze the behavior of the entity by comparing its current behavior
    RT to its past behavior LT:
    For each datapoint DP in the profile,
        Compare the current value in RT to the one in LT (by computing
        the ratio or distance between the values).
            If the ratio or distance is greater than the pre-defined threshold,
            Then increase the risk associated to the transaction T
            Else decrease the risk associated to the transaction T
    End For
    Return the global risk associated to the transaction T
End
```

The entity's behavior in the instant transaction can further be analyzed to determine if its real-time (RT) behavior is out of the norm compared to its peer groups, defined in the corresponding long-term (LT) profile. If a threshold (T) is exceeded, the transaction risk, verdict is incremented.

Recursive profiling compares the transaction (T) to the entity's peers one at a time.

```
compare_entity_to_peers ( T: transaction )
Begin
    Get the real-time profile RTe by calling compute_profile( T,
    real-time )
    Get the long-term profile LTe by calling compute_profile( T,
    long-term )
    Analyze the behavior of the entity by comparing it to its peer groups:
    For each peer group associated to the entity
        Get the real-time profile RTp of the peer: compute_profile( T,
        real-time )
        Get the long-term profile LTp of the peer: compute_profile( T,
        long-term )
        For each datapoint DP in the profile,
        Compare the current value in RTe and LTe to the ones in RTp and
        LTp (by computing the ratio or distance between the values).
            If the ratio or distance is greater than the pre-defined threshold,
            Then increase the risk associated to the transaction T
            Else decrease the risk associated to the transaction T
        End For
    End For
    Return the global risk associated to the transaction T
End
```

Each attribute inspection will either increase or decrease the associated overall transaction risk. For example, a transaction with a zipcode that is highly represented in the long term profile would reduce risk. A transaction amount in line with prior experiences would also be a reason to reduce risk.

But an MCC datapoint that has never been seen before for this entity represents a high risk. (Unless it could be forecast or otherwise predicted.)

One or more datapoints in a transaction can be expanded with a velocity count of how-many or how-much of the corresponding attributes have occurred over at least one different span of time intervals. The velocity counts are included in a calculation of the transaction risk.

Transaction risk is calculated datapoint-by-datapoint and includes velocity count expansions. The datapoint values that exceed a normative point by a threshold value increment the transaction risk. Datapoint values that do not exceed the threshold value cause the transaction risk to be decremented. A positive or negative bias value can be added that effectively shifts the threshold values to sensitize or desensitize a particular datapoint for subsequent transactions related to the same entity. For example, when an airline expense is certain to be followed by a rental car or hotel expense in a faraway city. The MCC's for rental car and hotel expenses are desensitized, as are datapoints for merchant locations in a corresponding far away city.

Figure 11:
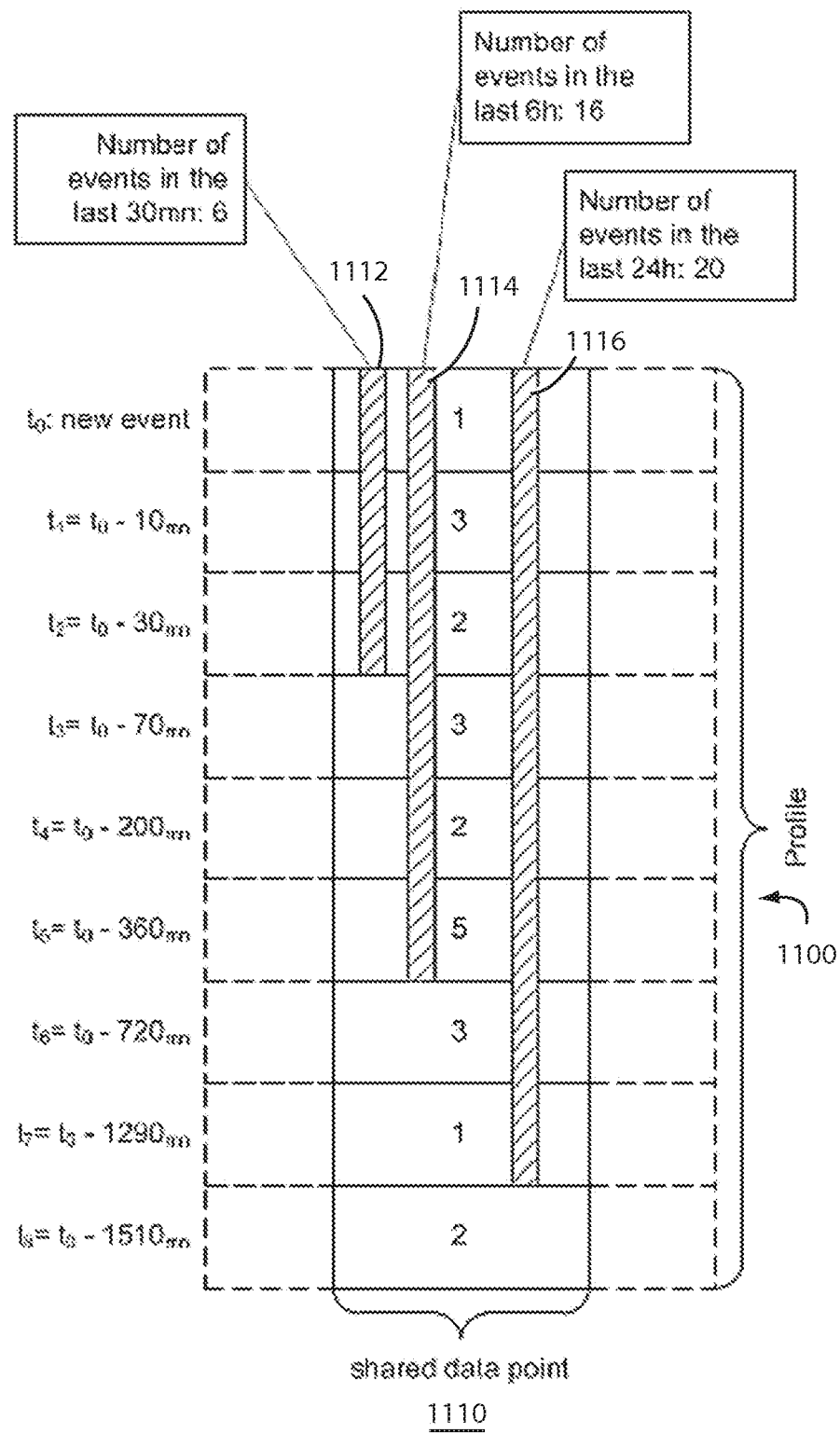
FIG. 11 is a diagram of a small part of an exemplary smart agent profile that spans several time intervals.

FIG. 11 illustrates an example of a profile 1100 that spans a number of time intervals $t_0$ to $t_8$. Transactions, and therefore profiles normally have dozens of datapoints that either come directly from each transaction or that are computed from transactions for a single entity over a series of time intervals. A typical datapoint 1110 velocity counts the number of events that have occurred in the last thirty minutes (count 1112), the last six hours (count 1114), and the last twenty-four hours (count 1116). In this example, to had one event, $t_1$ had 3 events, $t_2$ had 2 events, $t_3$ had 3 events, $t_4$ had 2 events, $t_5$ had 5 events, $t_6$ had 3 events, $t_7$ had one event, and $t_8$ had 2 events; therefore, $t_2$ count 1112=6, $t_6$ count 1114=16, and $t_7$ count 1116=20. These three counts, 1112-1116 provide their velocity count computations in a simple and quick-to-fetch summation.

Figure 12:
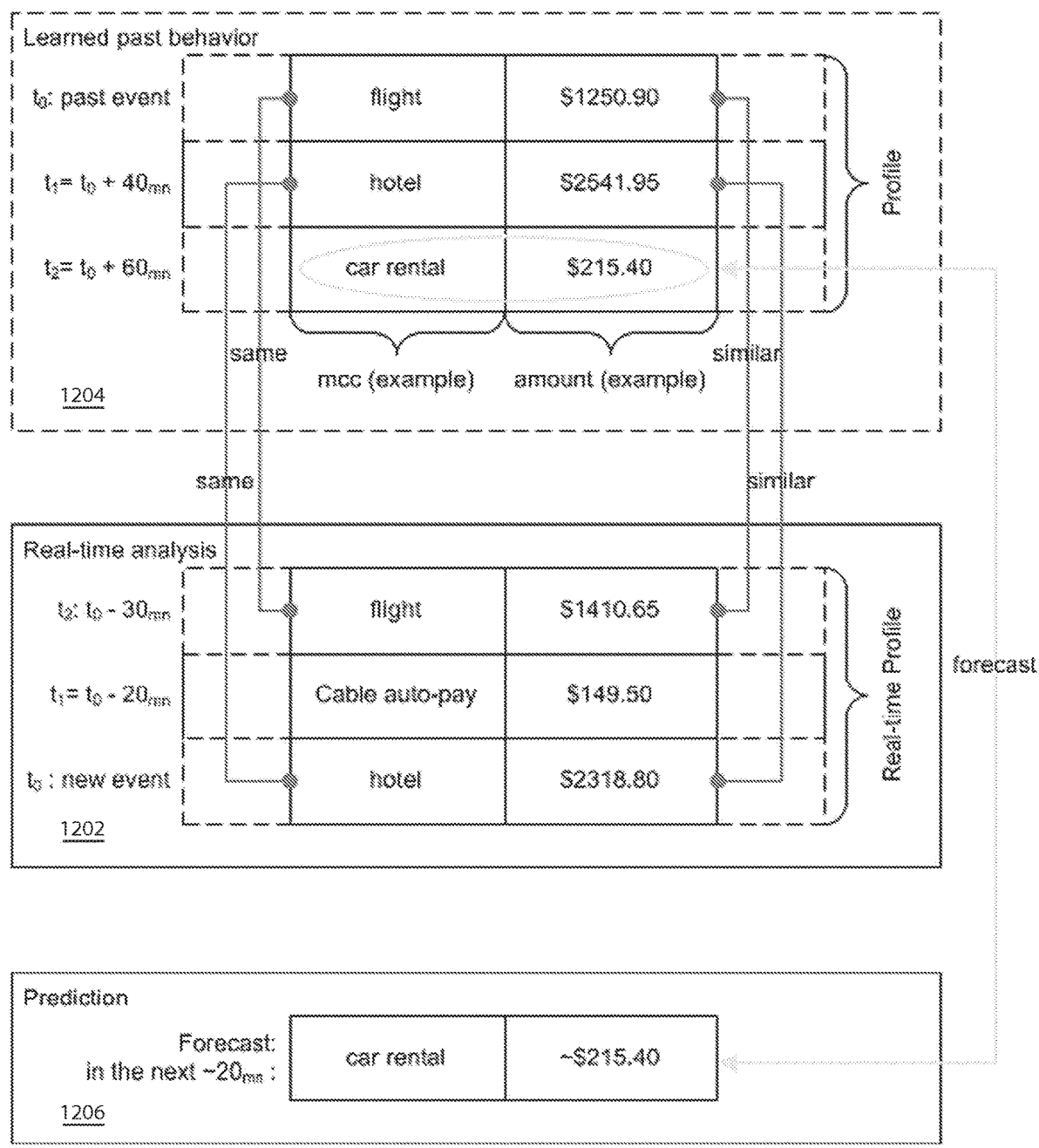
FIG. 12 is a diagram of a behavioral forecasting aspect of the present invention.

FIG. 12 illustrates a behavioral forecasting aspect of the present invention. A forecast algorithm 1200 engages in a real-time analysis 1202, consults a learned past behavior 1204, and then makes a behavioral prediction 1206. For example, the real-time analysis 1202 includes a flight purchase for $1410.65, an auto pay for cable for $149.50, and a hotel for $2318.80 in a most recent event. It makes sense that the booking and payment for a flight would be concomitant with a hotel expense, both represent travel. Consulting the learned past behavior 1204 reveals that transactions for flights and hotels has also been accompanied by a car rental. So an easy forecast for a car rental in the near future is and easy and reasonable assumption to make in behavioral prediction 1206.

Normally, an out-of-character expense for a car rental would carry a certain base level of risk. But if it can be forecast one is coming, and it arrives, then the risk can reduced since it has been forecast and is expected. Embodiments of the present invention therefore temporarily reduce risk assessments in the future transactions whenever particular classes and categories of expenses can be predicted or forecast.

In another example, a transaction to pay tuition at a local college could be expected to result in related expenses. So forecasts for bookstore purchases and ATM cash withdrawals at the college are reasonable. The bottom-line is fewer false positives will result.

FIG. 13 illustrates a forecasting example 1300. A smart agent profile 1302 has several datapoint fields, $field_1$ through $field_n$. Here we assume the first three datapoint fields are for the MCC, zipcode, and amount reported in a new transaction. Several transaction time intervals spanning the calendar year include the months of January . . . December, and the Thanksgiving and Christmas seasons. In forecasting example 1300 the occurrence of certain zip codes is nine for 94104, seven for 94105, and three for 94110. Transaction amounts range $5.80 to $274.50 with an average of $84.67 and a running total of $634.86.

A first transaction risk example 1304 is timestamped Dec. 5, 2013 and was for an unknown grocery store in a known zipcode and for the average amount. The risk verdict is thus plus, minus, minus for an overall low-risk.

A second transaction risk example 1306 is also timestamped Dec. 5, 2013 and was for a known grocery store in an unknown zipcode and for about the average amount. The risk verdict is thus minus, plus, minus for an overall low-risk.

A third transaction rick example 1306 is timestamped Dec. 5, 2013, and was for an airline flight in an unknown, far away zipcode and for almost three times the previous maximum amount. The risk verdict is thus triple plus for an overall high-risk. But before the transaction is flagged as suspicious or fraudulent, other datapoints can be scrutinized.

Each datapoint field can be given a different weight in the computation in an overall risk verdict.

In a forecasting embodiment of the present invention, each datapoint field can be loaded during an earlier time interval with a positive or negative bias to either sensitize or desensitize the category to transactions affecting particular datapoint fields in later time intervals. The bias can be permanent, temporary, or decaying to none.

For example, if a customer calls in and gives a heads up they are going to be traveling next month in France, then location datapoint fields that detect locations in France in next months' time intervals can be desensitized so that alone does not trigger a higher risk verdict. (And maybe a "declined" response.)

Some transactions alone herald other similar or related ones will follow in a time cluster, location cluster, and/or in an MCC category like travel, do-it-yourself, moving, and even maternity. Still other transactions that time cluster, location cluster, and/or share a category are likely to reoccur in the future. So a historical record can provide insights and comfort.

Figure 14:
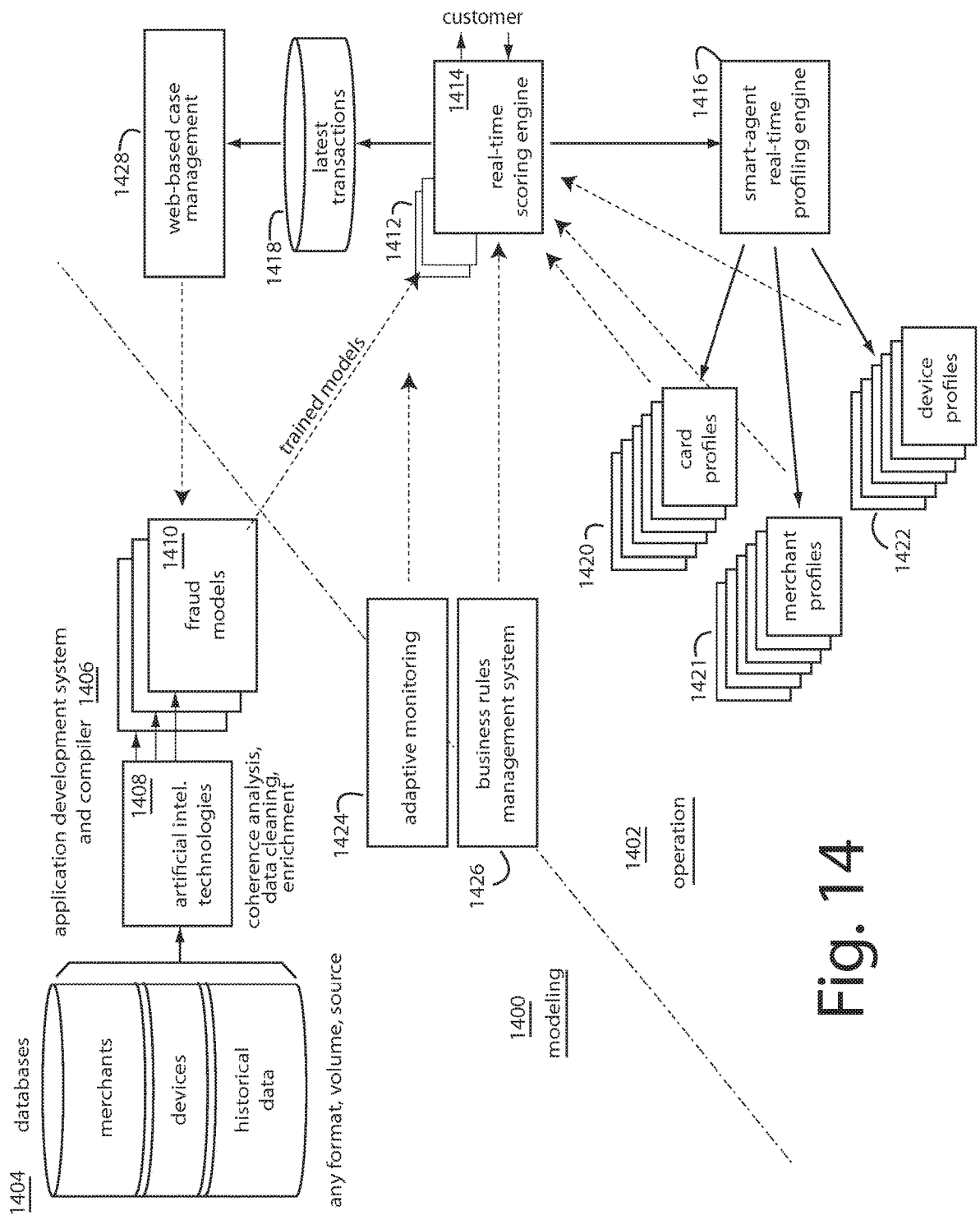
FIG. 14 is a functional block diagram of a modeling and operational environment in which an application development system is used initially to generate, launch, and run millions of smart agents and their profiles.

FIG. 14 represents the development, modeling, and operational aspects of a single-platform risk and compliance embodiment of the present invention that depends on millions of smart agents and their corresponding behavioral profiles. It represents an example of how user device identification (Device ID) and profiling is allied with accountholder profiling and merchant profiling to provide a three-dimensional examination of the behaviors in the penumbra of every transaction and authorization request. The development and modeling aspects are referred to herein by the general reference numeral 1400. The operational aspects are referred to herein by the general reference numeral 1402. In other words, compile-time and run-time.

The intended customers of embodiments of the present invention are financial institutions who suffer attempts by fraudsters at payment transaction fraud and need fully automated real-time protection. Such customers provide the full database dossiers 1404 that they keep on their authorized merchants, the user devices employed by their accountholders, and historical transaction data. Such data is required to be accommodated in any format, volume, or source by an application development method and compiler (ADSC) 1406. ADSC 1406 assists expert programmers to use a dozen artificial intelligence and classification technologies 1406 they incorporate into a variety of fraud algorithms 1410. This method is more fully described in U.S. patent application Ser. No. 14/514,381, filed Oct. 15, 2014 and titled, ARTIFICIAL INTELLIGENCE FRAUD MANAGEMENT SOLUTION. Such is fully incorporated herein by reference.

One or more trained fraud algorithms 1412 are delivered as a commercial product or service to a single platform risk and compliance server with a real-time scoring engine 1414 for real-time multi-layered risk management. In one perspective, trained algorithms 1412 can be viewed as efficient and compact distillations of databases 1404, e.g., a 100:1 reduction. These distillations are easier to store, deploy, and afford.

During operation, real-time scoring engine 1414 provides device ID and clickstream analytics, real-time smart agent profiling, link analysis and peer comparison for merchant/internal fraud detection, real-time cross-channel fraud prevention, real-time data breach detection and identification device ID and clickstream profiling for network/device protection.

A real-time smart agent profiling engine 1436 receives behavioral digests of the latest transactions 1418 and uses them to update three populations of profiles 1420-1422. Specifically, a population of card profiles 1420, a population of merchant profiles 1421, and a population of device profiles 1422 all originally generated by ADSC 1406 and included in the trained algorithms 1412. These are all randomly and individually consulted in real-time by smart agent profiling engine 1416 to understand what is "normal" for a particular card, merchant, and user device.

Real-time smart agent profiling engine 1416 accepts customer transaction data and verdicts each line. Such verdicts are in accordance with business rules provided by a business rules management method (BRMS) 1424 and any adaptive updates 1426 needed to the original set of algorithms 1410 produced by artificial intelligence technologies and classifiers 1408. A web-based case management method 1428 uses false positives and false negatives to tighten up algorithms 1410. These are periodically used to remotely update algorithms 1412.

In general smart agent method embodiments of the present invention generate a population of smart agent profiles by data mining of historical transaction data. A corresponding number of entities responsible for each transaction are sorted and each are paired with a newly minted smart agent profile. Each smart agent profile so generated is modeled to collect and list individual and expanded attributes of said transactions in one column dimension and by time interval series in another row dimension. Each smart agent profile is stored in a file access method of a network server platform.

Each newly arriving transaction record is compared and contrasted attribute-by-attribute with the time interval series of attributes archived in its paired smart agent profile, and each such comparison and contrast incrementally increases or decreases a computed fraud-risk-verdict. The computed fraud-risk-verdict is thereafter output as a determination of whether the newly arriving transaction record represents a genuine transaction, a suspicious transaction, or a fraudulent transaction. Or maybe just OK-bad, or a fuzzy verdict between 0 . . . 1.

Each time interval series can be partitioned or divided in its row dimension into a real-time part and a long-term part to separately ore-compute from the real-time part and the long-term part a velocity court and statistics of said individual and expanded attributes. The newly arriving transaction record is then compared item-by-item to relevant items in each said real-time part and long-term part, and thereby determines if each item represents known behavior or unknown behavior.

Each newly arriving transaction record is inspected to see if the entity it represents has not yet been paired to a smart agent profile, and if not then generating and pairing a newly minted smart agent profile for it.

In another embodiment, three populations of smart agent profiles are generated by learning from the historical transaction data. A corresponding number of cardholder, merchant, and identified device entities involved in each transaction are sorted and each are paired with a newly minted smart agent profile. Then, each newly arriving transaction record is compared and contrasted attribute-by-attribute with the time interval series of attributes archived in the smart agent profiles paired with the particular cardholder, and with the particular merchant, and with the particular identified device (Device ID), and each such comparison and contrast incrementally increases or decreases a computed overall fraud-risk-verdict. See our U.S. patent application Ser. No. 14/517,363, filed 19 Oct. 2014, and titled User Device Profiling In Transaction Authentications, for details on the Device ID technology we have in mind here.

DATA BREACH DETECTION: The artificial intelligence and machine learning techniques described above can be applied a unique combination to build effective data breach detection systems. A broad set of data was tested that included daily merchant card transactions from Nov. 1, 2013 to Dec. 31, 2013. Our analytics were applied to this dataset, and resulted in a greatly accelerated detection that a breach had occurred with Target.

Conventional methods are very slow because the rely on warehouses of already confirmed fraud.

Figure 15A:
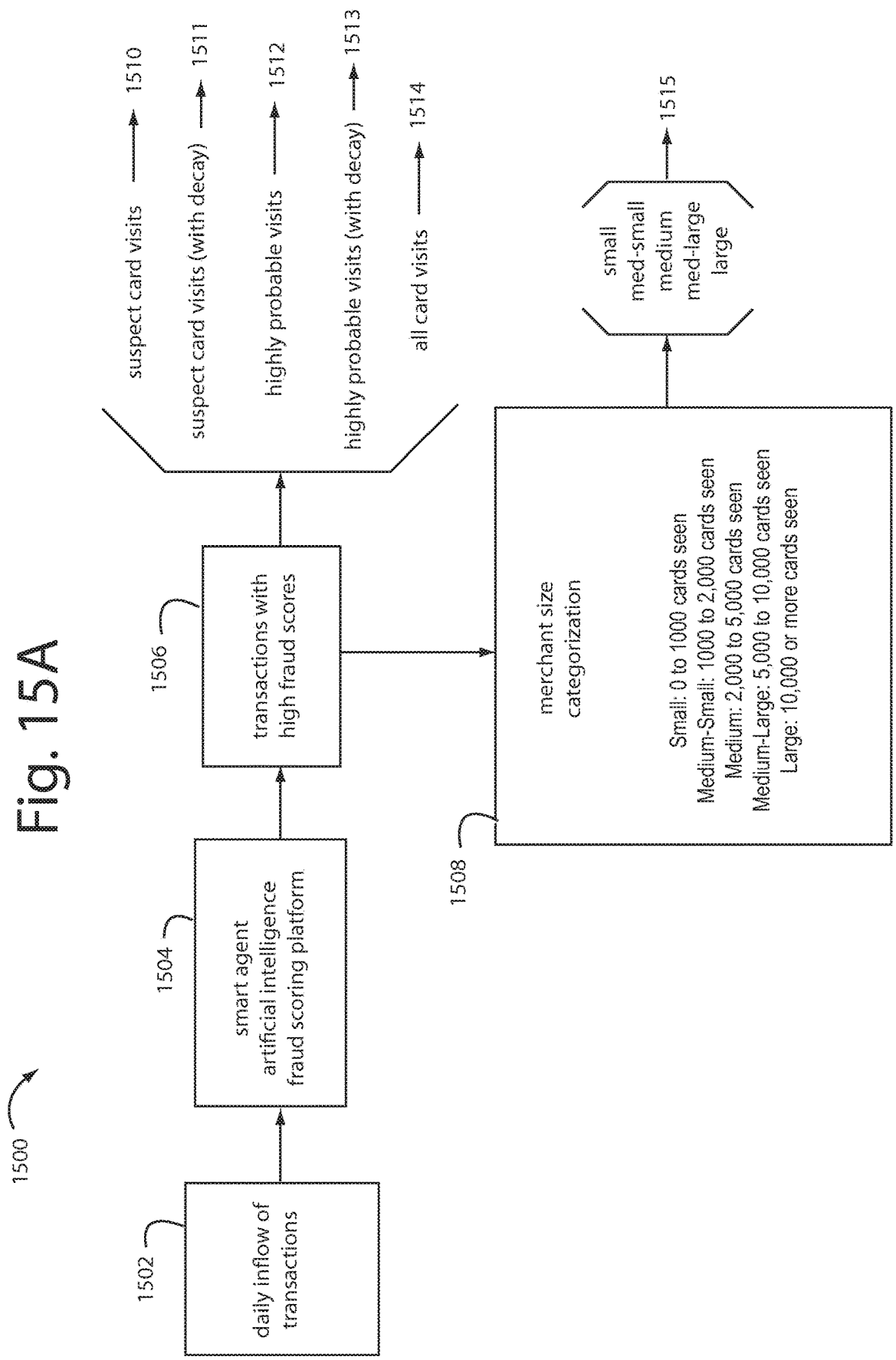
FIGS. 15A-15E represent the statistics and computations steps included in a data breach detection system embodiment of the present invention.
Figure 15B:
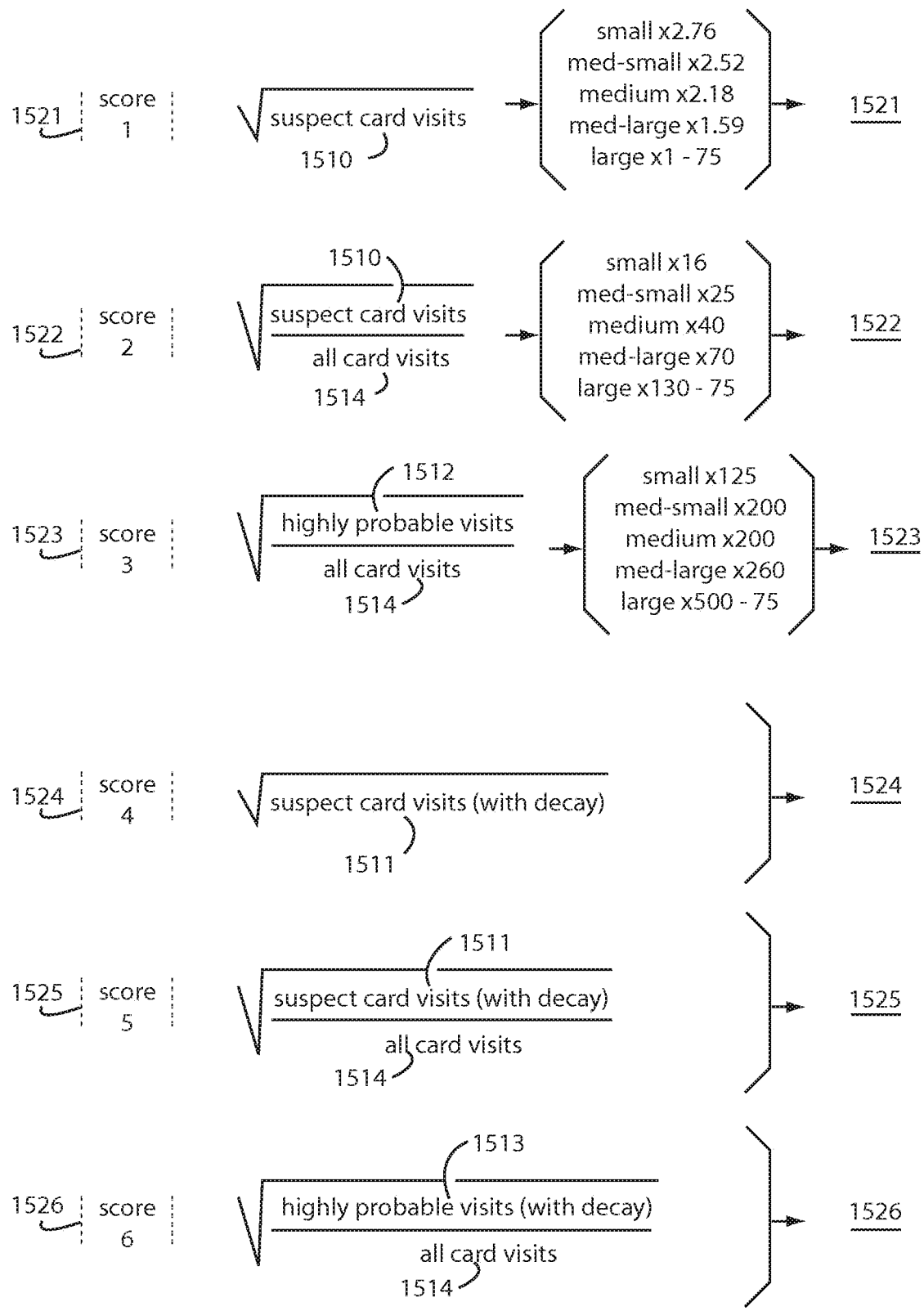
Figure 15C:
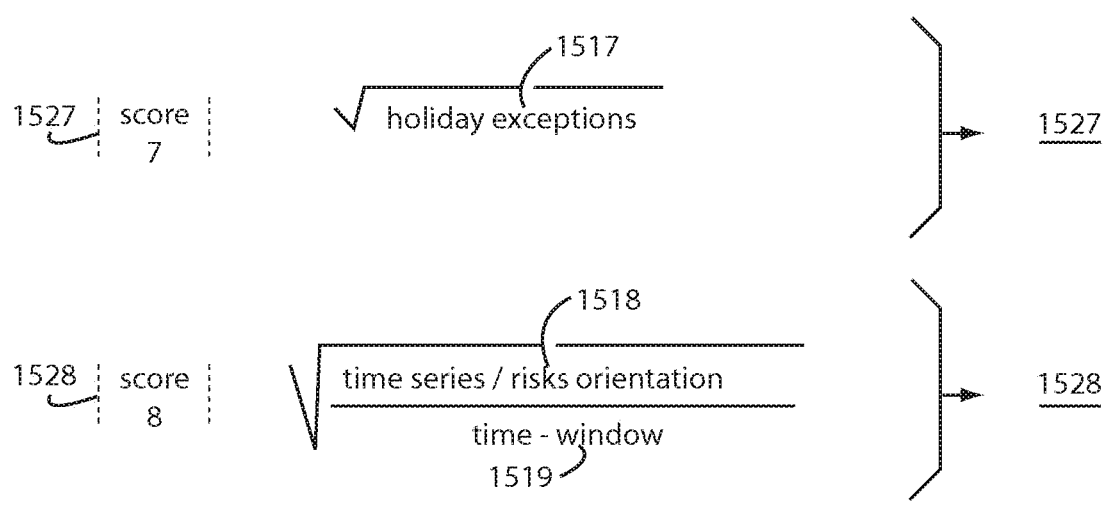

FIGS. 15A, 15B, and 15C represent a data breach detection method embodiment of the present invention, and is referred to herein by the general reference numeral 1500. The object is to develop an early alert that a merchant has suffered a data breach of sensitive cardholder and payment information. Data breach detection method 1500 focuses on the correlations between cardholders, merchants, and transaction dates in transactions receiving high-risk-fraud verdicts, e.g., 426 (FIG. 4), 552 (FIG. 5), 726 (FIG. 7), and 1414 (FIG. 14).

In tests with historical transaction data involving Target Corporation Stores, fraud verdicts such as these rose sharply at the same time the criminals begin their "test and try" activity. E.g., the first week of December. The following Table is of selected fey variables that were used to drive the analytics. Moderate increases in fraud are customary and expected during the days following Thanksgiving (Black Friday weekend). But Target Corporation saw a steady increase in suspicious card use. They also saw cards with confirmed fraud which had only been used at Target during the period in question.

TABLE

| | Selected Key Variables | |
|---|---|---|
| Transaction Date | Suspicious card use over the monitoring period | Cards with high fraud verdicts, only used at Target, over the monitoring period |
| Nov. 27, 2013 | 0.214% | 0.002% |
| Nov. 28, 2013 | 0.216% | 0.002% |
| Nov. 29, 2013 | 0.218% | 0.002% |
| Nov. 30, 2013 | 0.231% | 0.002% |
| Dec. 1, 2013 | 0.254% | 0.003% |

TABLE-continued

Selected Key Variables

| Transaction Date | Suspicious card use over the monitoring period | Cards with high fraud verdicts, only used at Target, over the monitoring period |
|---|---|---|
| Dec. 2, 2013 | 0.267% | 0.003% |
| Dec. 3, 2013 | 0.276% | 0.003% |
| Dec. 4, 2013 | 0.302% | 0.003% |
| Dec. 5, 2013 | 0.306% | 0.003% |
| Dec. 6, 2013 | 0.307% | 0.003% |
| Dec. 7, 2013 | 0.309% | 0.003% |
| Dec. 8, 2013 | 0.310% | 0.003% |
| Dec. 9, 2013 | 0.304% | 0.003% |
| Dec. 10, 2013 | 0.300% | 0.003% |
| Dec. 11, 2013 | 0.298% | 0.003% |
| Dec. 12, 2013 | 0.299% | 0.003% |
| Dec. 13, 2013 | 0.301% | 0.003% |
| Dec. 14, 2013 | 0.304% | 0.003% |
| Dec. 15, 2013 | 0.304% | 0.003% |
| Dec. 16, 2013 | 0.302% | 0.003% |
| Dec. 17, 2013 | 0.299% | 0.004% |

A comparison was made of the data breach detection method verdicts between Target and other merchants that cater to a similar demographic and during the same time period. The verdicts showed that cards used at Target displayed behaviors that were clearly irregular, and evidence of abnormal behavior became clear as early as the first week of December.

The data breach detection method verdicts for Target were contrasted with an online gaming merchant's verdicts. The online gaming merchant had a higher baseline of fraud, but their verdicts held steady during the timeframe of Target's breach.

The data breach detection method tests examined network level data, but would also be effective when applied to a large issuer or processor's dataset. Data breach detection method embodiments of the present invention snaps quicker to anomalous behaviors that are suggestive of a breach. As such, their use can minimize looming negative impacts.

Data broach detection method embodiments of the present invention analyze fraudulent card activities and evaluate real-time transactions to determine if any come from a compromised merchant, before waiting for transactions to be reported as fraudulent by the cardholder. These data breach detection systems use the daily transactions to collect all cards with a large fraud verdict (very high risk). A lowered verdict threshold allows a larger more sensitive detection rate of all frauds, while a higher setting will reduce false positives.

In tests, some transactions that were considered to be fraudulent were often the fallout from aggressive merchants. Such merchants force subscriptions and reoccurring payments that are difficult to cancel and often misunderstood by customers. So since these are not the result, of a data breach, a filter was placed on the initial fraud card collection to exclude reoccurring transactions.

Newly acquired fraudulent cards are often tested by criminals to see if the cards will still work, before stepping up to more serious levels of fraud. These test transactions are always for small amounts, and will not be detected and reported as fraud, even though they are. So in the tests, a filter was placed on seemingly genuine transactions to exclude transactions of $2.00 or less. It is anticipated that including only transactions of $2.00 or less could lead to detecting test merchants, as opposed to a data breach.

A table is assembled for each merchant in the reported high risk transaction data. A temporary key is used in place of the original merchant identifier to make for a more uniform data type. Transactions for peak season dates, such Black Friday to Cyber Monday, were dropped. The card information, merchant information, and how the combinations of card/merchants interact and the last time each card visits a particular merchant were grouped together. The merchants each cardholder visited were ranked "1" (first), to the last, but no higher than "100".

A larger information matrix organizing the merchant and card information was created after cleaning up the data. Each row represented a different card, and a list of the past one hundred merchants they visited, which allowed a quick broad view of events.

In a next step, the card and merchant matrix is evaluated, by summing over rows and then the columns to create scoring criteria that spans more than one statistic at a time. These verdicts are balanced, adjusted, and combined into a singular final verdict. A summary table for each outlet, and initial scoring criteria is created. The summary table included the number of suspect cards that visited, the sum of the percentages of those cards visits, and more advanced strategies still being testing.

Each outlet has linear combinations of the summary statistics and initial scoring criteria placed together to come up with a final verdict. Different strategies are being used, and filters are edited to help evaluate, understand, and update the verdicts.

FIG. 15A shows how the daily inflow of transactions 1502 is fed to a smart agent artificial intelligence fraud scoring platform 1504 to obtain a daily set 1506 of transactions with high fraud verdicts.

A number of different statistics are used in the scoring mechanisms. These fields are highly relevant to data breaches and helpful for judging the predictions of the final verdicts later. For example in FIG. 15A these are listed as suspect-card-visits 1510, suspect-card-visits-with decay 1511, highly-probable-visits 1512, highly-probable-visits-with decay 1513, and all card-visits 1514. Defined another way:

1. NUMBER_OF_CARDS
   a. This is the total number of different cards (Genuine and Suspect) seen by a merchant in the past, e.g., 30 days.
   b. Used to differentiate merchant size
   c. Inversely proportionate to the risk of data breach.
2. SUSPECT_CARD_VISITS
   a. This is the total number of different suspect cards seen by a merchant in the past, e.g., 30 days
   b. Major part of scoring for data breach
3. SUM_PROB_VISITS
   a. This is the total number of suspect cards, which were highly probable to have been breached at that merchant, seen by a merchant in the past, e.g., 30 days.
   b. These combinations are considered more high risk because the card has only visited that merchant in this time period.
4. SUSPECT_CARD_VISITS_DCY
   a. Similar to SUSPECT_CARD_VISITS, but includes a decaying function based on how many merchants were visited between the current merchant and the suspected fraud.
   b. Not currently used, but available for continued future analysis.
5. SUM_PROB_VISITS_DCY
   a. Similar to SUM_PROB_VISITS, but cards which have visited more than one merchant also add to the verdict proportional to the number of other merchants they have visited.

b. This version also includes decay similar to SUSPECT_CARD_VISITS_DCY which is included with the proportional value change. (This extra decay can be removed).
c. Not currently used, but available for continued future analysis.
6. PCT_OFSCARDS_STOLEN_LATER
  a. This is SUSPECT_CARD_VISITS/NUMBER_OF_CARDS=the percentage of suspect cards out of all cards seen by that merchant.
7. SUM_PROB_DIV_NUM_CRD
  a. This is SUM_PROB_VISITS/NUMBER_OF_CARDS=the percentage of suspect cards that visited only that merchant out of all cards seen by that merchant.
8. Run_Date
  a. The day that the Data breach detection method was run on, expected to equal today's date, but can be different when run over past data for historical observations and testing.

Verdict balancing is needed to level the playing field, the verdicts and other information are collected and used to compare merchants and determine the optimal strategy for merchant and data breach risk. Because of the large differences between merchant size, the collected verdicts were weighted in merchant categorization method 1508 based on how many cards, genuine and suspect, a merchant has seen within the past thirty days. There are five main groups 1515, medium-small, medium, and medium-large, and large. Most merchants judged belonged in the middle three groups: medium-small, medium, and medium-large.

Group Sizes 1515
1. Small: 0 to 1000 cards seen
2. Medium-Small: 1000 to 2,000 cards seen
3. Medium: 2,000 to 5,000 cards seen
4. Medium-Large: 5,000 to 10,000 cards seen
5. Large: 10,000 or more cards seen Verdict transformations are based on the distributions and values of the main scoring statistics seen, new derived values are created. Because many of these verdicts had large disproportionate distributions, the square root function was used to normalize significant values and lower outlier values while preserving verdict rankings.

| | |
|---|---|
| VERDICT_1 | $\sqrt{\text{SuspectCardVisits}}$ |
| VERDICT_2 | $\sqrt{\dfrac{\text{Suspect Card Visits}}{\text{All Card Visits}}}$ |
| VERDICT_3 | $\sqrt{\dfrac{\text{Highly Probable Visits}}{\text{All Card Visits}}}$ |
| VERDICT_4 | $\sqrt{\text{SuspectCardVisits(WithDecay)}}$ |
| VERDICT_5 | $\sqrt{\dfrac{\text{Suspect Card Visits (With Decay)}}{\text{All Card Visits}}}$ |
| VERDICT_6 | $\sqrt{\dfrac{\text{Highly Probable Visits (With Decay)}}{\text{All Card Visits}}}$ |
| VERDICT_7 | $\sqrt{\text{HolidaysExceptions}}$ |
| VERDICT_8 | $\sqrt{\dfrac{\text{Time series/risks or orientation}}{\text{Time - Window}}}$ |

A handful of merchants at the top list were verified in testing by searching through news reports, articles, and other media sources available. In FIG. 15B, a verdict-1 1521, a verdict-2 1522, and a verdict-3 1523 were chosen based on their comparative values for a few known data breaches. These verdicts for known data breaches were compared to the general population of all verdicts seen in the set being tested.

Verdicts 1321-1523 were balanced with others all within each merchant size group 1515. The center values (median/average) of Verdict-1 1521 were compared to the center values of Verdict-2 1522 and Verdict-3 1523. As seen in FIG. 15B, multipliers for Verdict-2 and Verdict-3 were created based on these numbers. So any merchant showing a large value, when compared to other merchants in their group, in one or multiple parts of these verdicts could spring an alert.

SIZE ADJUSTMENTS

| Merchant Size | Verdict-1 Multiplier | Verdict-2 Multiplier | Verdict-3 Multiplier | Flat Adjustment |
|---|---|---|---|---|
| Small | 2.76 | 16 | 125 | 0 |
| Medium-Small | 2.52 | 25 | 200 | 0 |
| Medium | 2.18 | 40 | 200 | 0 |
| Medium-Large | 1.59 | 70 | 260 | 0 |
| Large | 1 | 130 | 500 | −75 |

A similar multiplier was created for Verdict-1, comparing the ratio of large Verdict-1 to the other merchant sizes' Verdict-1. This multiplier adjusts all five groups final verdicts for the same scale. This allows all merchants, regardless of size, to be considered for a data breach. This was not done on Verdict-2 and Verdict-3 because they already included the total cards seer, within their calculations.

Merchants within the Large group have an almost guaranteed number of suspect transactions due to size alone. Verdict-1 was seen to have larger minimum and maximums for this group. A flat value of 75 is deducted from the Large merchant verdicts, these are determined by where the difference in distributions of initial combination verdicts for the Large group versus all other groups.

Figure 15D:
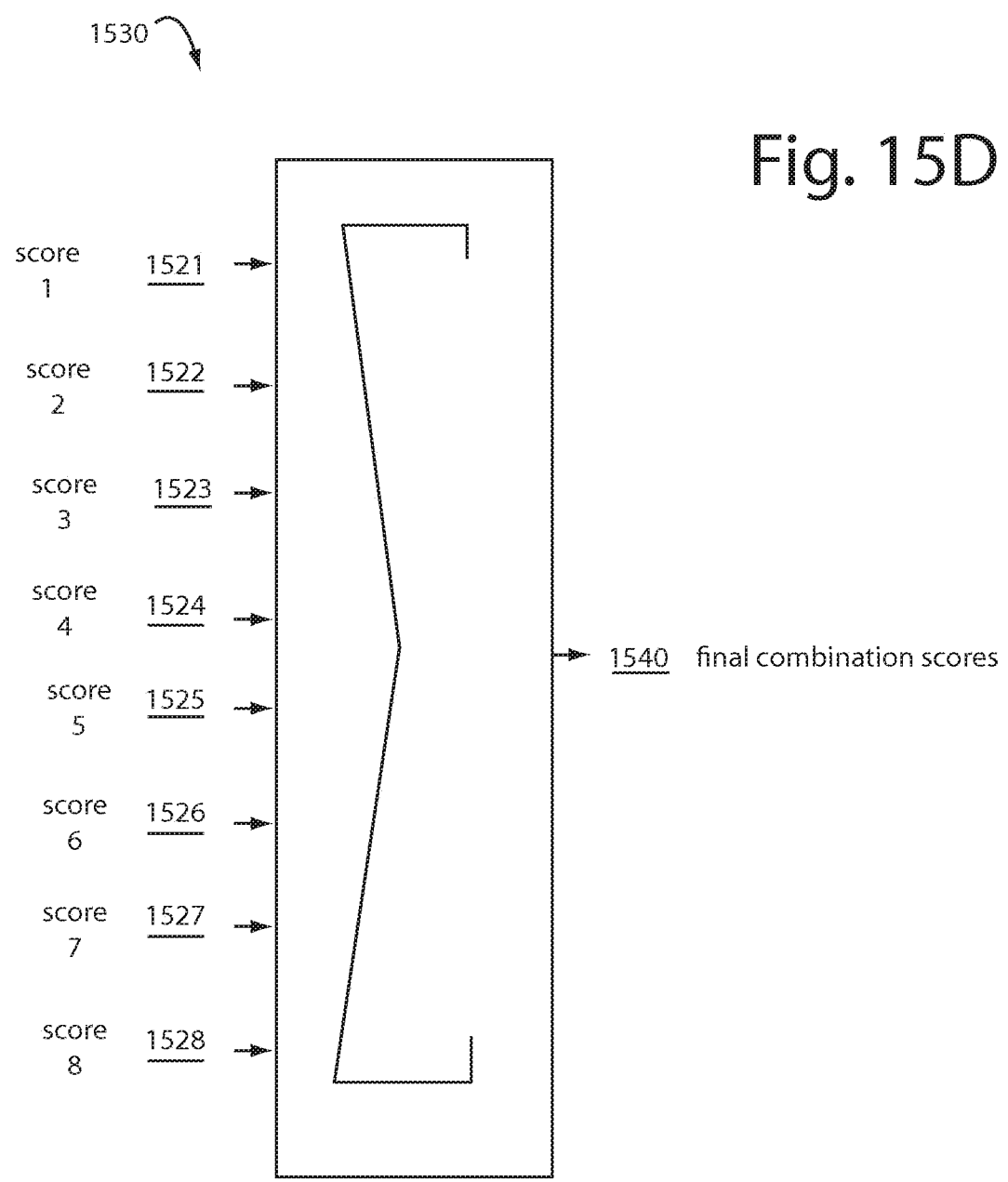

In FIG. 15D, after adjustments are made, all verdicts 1521-1528 (FIGS. 15B and 15C) are added together in a summation method 1530 for each merchant, and final combination verdicts 1540 are created. These verdicts reflect the estimated risks that any particular merchant suffered a data breach.

The prototype data breach detection method was rerun using historical data for each day between Nov. 1, 2013 to Jan. 31, 2014. The following table includes the top highest scoring merchants within each merchant group size they belonged to, with the first date they broke the threshold of 50.0, and with the highest verdict they ultimately received in the time line.

| OUTLET_ID | MERCHANT GROUPING | FIRST ALERT DATE | TOP VERDICT |
|---|---|---|---|
| 0032861 | large | 1-Nov-yr | 215.019167 |
| 0032862 | large | 1-Nov-yr | 158.807118 |
| 0032863 | large | 1-Nov-yr | 145.472479 |
| 0055411 | medium | 2-Nov-yr | 143.720407 |
| 0047981 | large | 1-Nov-yr | 125.645545 |
| 0032864 | large | 1-Nov-yr | 122.459354 |
| 0082732 | large | 1-Nov-yr | 108.013765 |
| 0072601 | medium-large | 1-Nov-yr | 107.884795 |
| 0032866 | large | 1-Nov-yr | 105.166112 |
| 0039622 | medium | 1-Nov-yr | 104.738724 |
| 0082734 | medium | 1-Nov-yr | 103.088835 |
| 0029508 | small | 24-Jan-next year | 97.705843 |
| 0074780 | medium | 26-Dec-yr | 93.0173564 |
| 0067200 | medium | 29-Dec-yr | 90.6907448 |
| 0029500 | medium | 1-Nov-yr | 89.9405071 |

False positives were still seen as possible, even though steps were taken to remove aggressive merchants and small-amount tested merchants from the data. There were some residual effects of these merchants in the final outcomes. Their effects are considered to be minimal, and over time any reoccurring alerts on these merchants would become more evident.

| Run Date | NUMBER_OF_CARDS | SUSPECT_CARD_VISITS | SUM_PROB_VISITS |
|---|---|---|---|
| 18-Nov-yr | 5,256,362 | 11,102 | 137 |
| 19-Nov-yr | 5,237,723 | 10,983 | 136 |
| 20-Nov-yr | 5,213,239 | 10,953 | 137 |
| 21-Nov-yr | 5,224,253 | 11,065 | 130 |
| 22-Nov-yr | 5,232,915 | 11,165 | 125 |
| 23-Nov-yr | 5,237,325 | 11,284 | 131 |
| 24-Nov-yr | 5,257,310 | 11,440 | 139 |
| 25-Nov-yr | 5,317,823 | 11,531 | 155 |
| 26-Nov-yr | 5,309,759 | 11,386 | 144 |
| 27-Nov-yr | 5,309,074 | 11,356 | 121 |
| 28-Nov-yr | 5,340,793 | 11,532 | 130 |
| 29-Nov-yr | 5,389,232 | 11,726 | 129 |
| 30-Nov-yr | 5,248,363 | 12,127 | 120 |
| 1-Dec-yr | 5,133,081 | 13,039 | 130 |
| 2-Dec-yr | 5,002,787 | 13,355 | 131 |
| 3-Dec-yr | 4,827,851 | 13,332 | 134 |
| 4-Dec-yr | 4,668,190 | 14,101 | 125 |
| 5-Dec-yr | 4,713,529 | 14,432 | 130 |
| 6-Dec-yr | 4,750,209 | 14,571 | 144 |
| 7-Dec-yr | 4,789,920 | 14,797 | 156 |

Figure 15E:
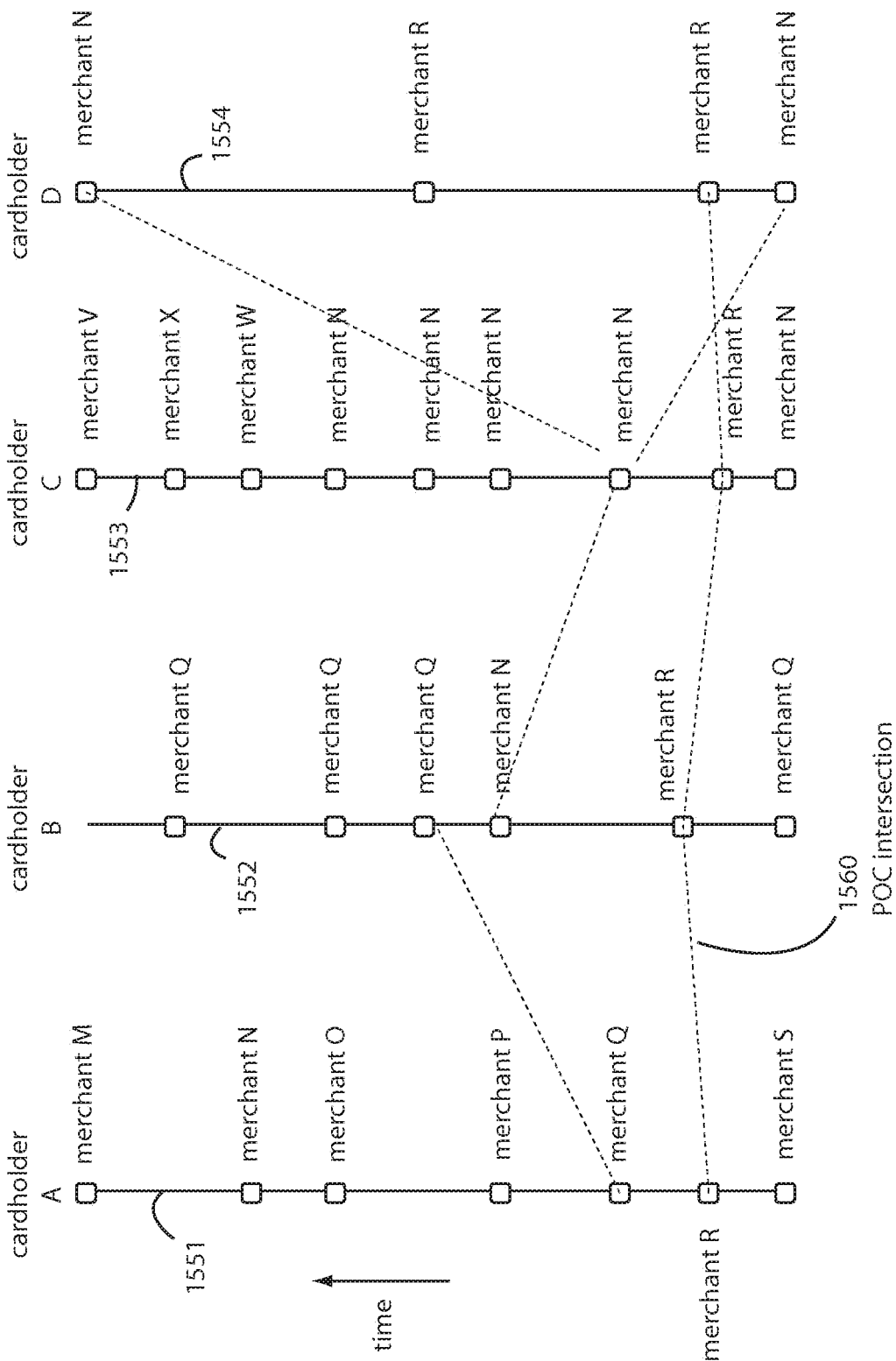
Figure 16:
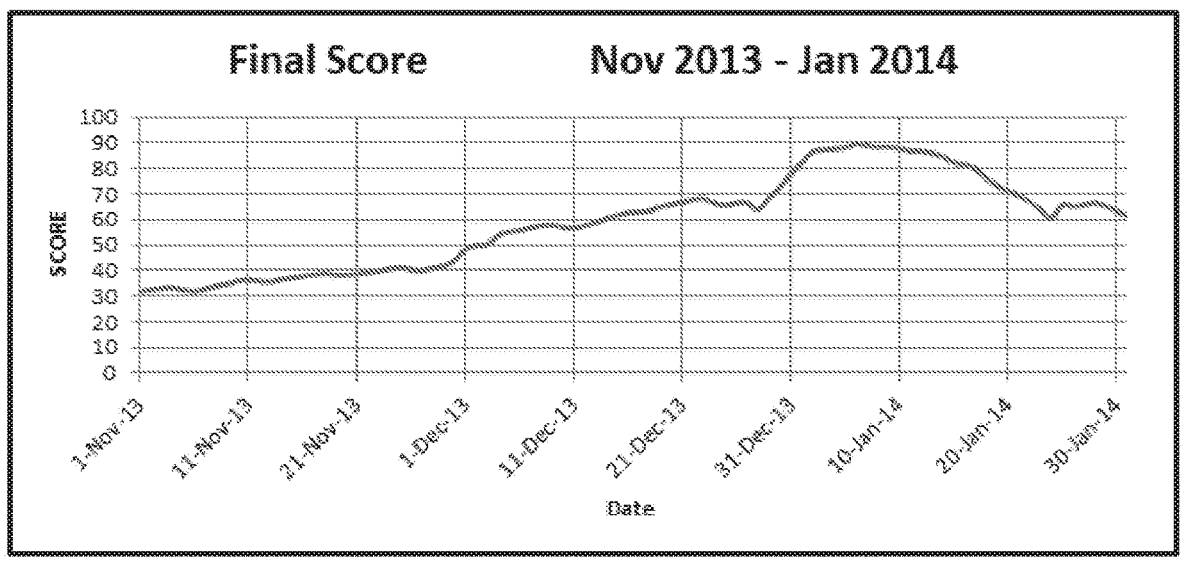

FIG. 15E represents four time series of payment card transactions 1550 belonging to seemingly unrelated Cardholder-A 1551, Cardholder-B 1552, Cardholder-C 1553, and Cardholder-D 1554. Cardholder-A and the others all came to the attention of Data Breach Detection method 1500 by virtue of having had been associated with a transaction judged as high risk by artificial intelligence fraud scoring platform 1504. That further instituted a fetch of all the recent transactions the Cardholder was involved in with an eye to the merchants or other points-of-compromise (POC) they visited. Once all the possibly compromised Cardholders have thus been brought forward, summation method 1530 searches for a POC intersection 1560. The common intersections are inspected for even earlier contacts with the POC's. Here, in this example, merchant-R appears to be a likely point-of-compromise.

Once a point-of-compromise is in the view-sights of Data Breach Detection method 1500, all the cardholders and transactions they handled during a critical time frame can be investigated to develop a further focus and confirmation. Investigators can thereby "zoom in" and search for the telltale signs of a data breach.

Figure 16:
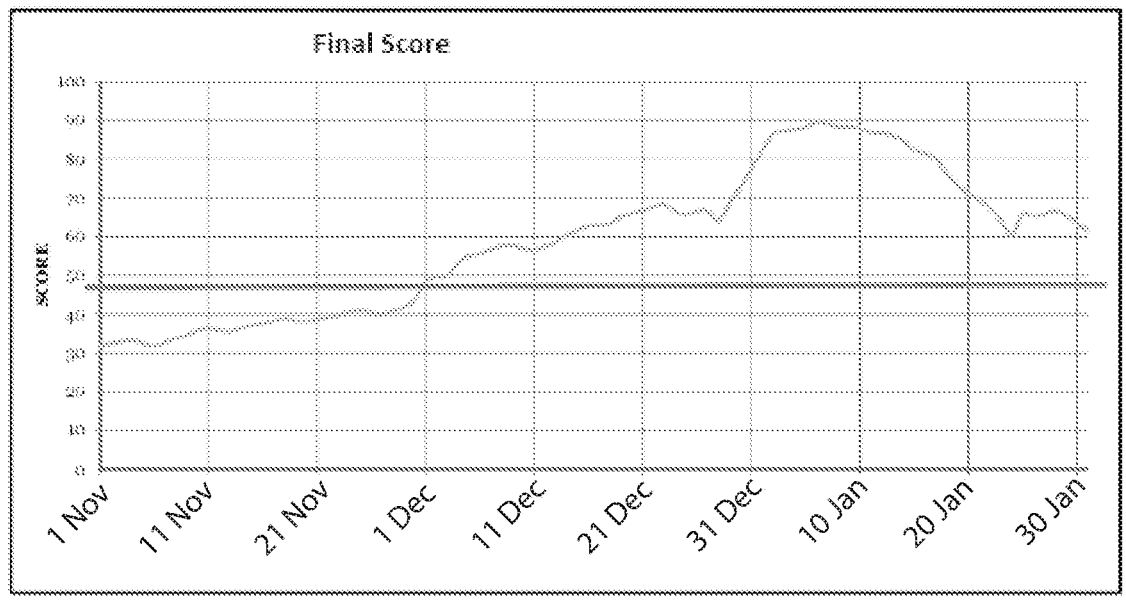
FIG. 16 is a graph of the verdicts computed from historical data for Target from November 2013 to January 2014.

FIG. 16 graphs the verdicts computed for a Retailer from the historical data between November to the next. January. About the same time period, when the fraud verdict for the Retailer broke a threshold of 50.0, an investigation was made to see what other merchants also broke the same threshold. Those that did are listed below, except for merchants which had a verdict of 50.0 or greater in the previous week. They were excluded.

Some method embodiments of the present invention include grouping together card information, merchant information, and any combinations of card/merchants interact and the last time each card visits a particular merchant were grouped together with a computer programmed for this purpose that. The merchants each cardholder visited were ranked "1" (first), to the last, e.g., no higher than "100".

In a next step, the card and merchant matrix is evaluated, by summing over rows and then the columns to create scoring criteria that spans more than one statistic at a time. These verdicts are balanced, adjusted, and combined into a singular final verdict. A summary table for each outlet, and initial scoring criteria is created. The summary table included the number of suspect cards that visited, the sum of the percentages of those cards visits, and more advanced strategies still being testing.

NUMBER_OF_CARDS is the total number of different cards (Genuine and Suspect) seen by a merchant in the past, e.g., 30 days. Used to differentiate merchant size. Inversely proportionate to the risk of data breach.

SUSPECT_CARD_VISITS is the total number of different suspect cards seen by a merchant in the past, e.g., 30 days. Major part of scoring for data breach SUM_PROB_VISITS is the total number of suspect cards, which were highly probable to have been breached at that merchant, seen by a merchant in the past, e.g., 30 days. These combinations are considered more high risk because the card has only visited that merchant in this time period.

SUSPECT_CARD_VISITS_DCY is similar to SUSPECT_CARD_VISITS, but includes a decaying function based on how many merchants were visited between the current merchant and the suspected fraud.

SUM_PROB_VISITS_DCY is similar to SUM_PROB_VISITS, but cards which have visited more than one merchant also add to the verdict proportional to the number of other merchants they have visited.

This version also includes decay similar to SUSPECT_CARD_VISITS_DCY which is included with the proportional value change. (This extra decay can be removed).

PCT_OFSCARDS_STOLEN_LATER is SUSPECT_CARD_VISITS/NUMBER_OF_CARDS=the percentage of suspect cards out of all cards seen by that merchant.

SUM_PROB_DIV_NUM_CRD is SUM_PROB_VISITS/NUMBER_OF_CARDS=the percentage of suspect cards that visited only that merchant out of all cards seen by that merchant.

Run_Date is the day that the Data breach detection method was run on, expected to equal today's date, but can be different when run over past data for historical observations and testing.

Verdict balancing levels the playing field. The verdicts and other information collected are used to compare merchants and determine the best strategy for merchant and data breach risk. The large differences in merchant size requires the collected verdicts to be weighted.

A merchant categorization method that can be used is based on how many cards, genuine and suspect, a merchant has seen within the past thirty days. There are five main groups, medium-small, medium, and medium-large, and large. Most merchants judged belonged in the middle three groups: medium-small, medium, and medium-large.

Once a point-of-compromise is assessed as likely, all the cardholders and transactions they handled during a critical time frame are investigated more fully for confirmation. Investigators can thereby "zoom in" and search for the telltale signs of a data breach.

A merchant data breach method comprises processing daily payment transaction data with a risk and compliance platform to obtain a fraud verdict for each constituent transaction. Then screening through said constituent transactions with high-risk-fraud verdicts and sorting them into a table according to transaction date, cardholder, and merchant, and tallying the number of suspected card visits, highly probable card visits, and total card visits per merchant. Then scoring the table data according to suspected card visits, highly probable visits, and all card visits. And standardizing the verdicts according to merchant size grouping through the use of multipliers. This is followed by summing the standardised verdicts together into a final verdict day-by-day. A final step issues a merchant data breach alert if a final verdict and sum of the normalized verdicts exceeds a threshold. A timely alert of an underlying and expanding security rupture caused by a merchant data breach is issued for damage control and law enforcement.

Although particular embodiments of the present invention have been described and illustrated, such is not intended to limit the invention. Modifications and changes will no doubt become apparent to those skilled in the art, and it is intended that the invention only be limited by the scope of the appended claims.

What is claimed:

1. At least one computer network server for detection of merchant data breaches, the at least one server comprising:
   one or more processors;
   non-transitory computer-readable storage media having computer-executable instructions stored thereon, wherein when executed by the one or more processors the computer-readable instructions cause the one or more processors to—
   receive transaction data corresponding to a plurality of transactions associated with a plurality of transactional entities, the transaction data including a merchant identifier and a payment card identifier for each of the plurality of transactions;
   compute a fraud score for each of the plurality of transactions at least in part by—
      inputting transaction data of the transaction to a classification model and a smart agent associated with the corresponding transactional entity to generate a first output from the smart agent and a second output from the classification model, the smart agent comprising a representation of historical data of the corresponding transactional entity and the classification model being constructed according to one or more of: data mining logic, a neural network, case-based-reasoning, clustering, fuzzy logic, a genetic algorithm, a decision tree, and business rules,
      analyzing the first output and the second output using a weighted summation to generate the fraud score for the transaction;
   identify a subset of the fraud scores for the plurality of transactions, each of the fraud scores of the subset exceeding a first threshold;
   count members of the subset corresponding to each of the merchant identifiers;
   generate a final merchant fraud score for each of the merchant identifiers based at least in part on the count of members of the subset corresponding to each of the merchant identifiers;
   compare the final merchant fraud score for at least one of the merchant identifiers against a second threshold to identify a possible breach;
   issue a warning based on the identified possible breach.

2. The at least one computer network server of claim 1, wherein generating the first output for each of the plurality of transactions includes comparing contents of at least one data field of the transaction data against a profile of the smart agent associated with the transactional entity corresponding to the transaction.

3. The at least one computer network server of claim 1, wherein analyzing the first output and the second output using the weighted summation includes retrieving one or more client tuning inputs and incorporating the one or more client tuning inputs into the weighted summation.

4. The at least one computer network server of claim 1, wherein generating the final merchant fraud score for each of the merchant identifiers includes—
   counting the number of the plurality of transactions corresponding to each of the merchant identifiers;
   computing and normalizing a plurality of merchant fraud scores for each of the merchant identifiers based at least in part on the counted members and the number of the plurality of transactions corresponding to each merchant identifier;
   balancing each of the plurality of merchant fraud scores corresponding to each of the merchant identifiers based at least in part on center values for merchant identifier groups;
   summing the plurality of merchant fraud scores corresponding to each of the merchant identifiers.

5. The at least one computer network server of claim 4, wherein the computer-readable instructions further instruct the one or more processors to delineate the merchant identifier groups based at least in part on the numbers of the plurality of transactions corresponding to the merchant identifiers.

6. The at least one computer network server of claim 4, the representation of historical data of each smart agent corresponding to a profile comprising a time interval series of attributes mined from historical transaction data, wherein computing the fraud score for each of the plurality of transactions includes—
    matching the transaction to the corresponding profile;
    incrementally changing a fraud risk based on attribute-by-attribute comparison of the transaction data corresponding to the transaction against the profile;
    outputting the fraud score for the transaction based at least in part on the comparison against the profile.

7. The at least one computer network server of claim 4, the representation of historical data of each smart agent corresponding to three profiles each comprising a time interval series of attributes mined from historical transaction data, wherein computing the fraud score for each of the plurality of transactions includes—
    matching the transaction to the three profiles, the three profiles being respectively matched based on the payment card identifier, the merchant identifier and an identified device corresponding to the transaction;
    incrementally changing a fraud risk based on attribute-by-attribute comparison of the transaction data corresponding to the transaction against the profiles;
    outputting the fraud score for the transaction based at least in part on the comparison against the profiles.

8. Non-transitory computer-readable storage media having computer-executable instructions for detection of merchant data breaches, wherein when executed by at least one processor the computer-readable instructions cause the at least one processor to:
    receive transaction data corresponding to a plurality of transactions associated with a plurality of transactional entities, the transaction data including a merchant identifier and a payment card identifier for each of the plurality of transactions;
    compute a fraud score for each of the plurality of transactions at least in part by—
        inputting transaction data of the transaction to a classification model and a smart agent associated with the corresponding transactional entity to generate a first output from the smart agent and a second output from the classification model, the smart agent comprising a representation of historical data of the corresponding transactional entity and the classification model being constructed according to one or more of: data mining logic, a neural network, case-based-reasoning, clustering, fuzzy logic, a genetic algorithm, a decision tree, and business rules,
        analyzing the first output and the second output using a weighted summation to generate the fraud score for the transaction,
    identify a subset of the fraud scores for the plurality of transactions, each of the fraud scores of the subset exceeding a first threshold;
    count members of the subset corresponding to each of the merchant identifiers;
    generate a final merchant fraud score for each of the merchant identifiers based at least in part on the count of members of the subset corresponding to each of the merchant identifier;
    compare the final merchant fraud score for at least one of the merchant identifiers against a second threshold to identify a possible breach;
    issue a warning based on the identified possible breach.

9. The non-transitory computer-readable storage media of claim 8, wherein generating the first output for each of the plurality of transactions includes comparing contents of at least one data field of the transaction data against a profile of the smart agent associated with the transactional entity corresponding to the transaction.

10. The non-transitory computer-readable storage media of claim 8, wherein analyzing the first output and the second output using the weighted summation includes retrieving one or more client tuning inputs and incorporating the one or more client tuning inputs into the weighted summation.

11. The non-transitory computer-readable storage media of claim 8, wherein generating the final merchant fraud score for each of the merchant identifiers includes—
    counting the number of the plurality of transactions corresponding to each of the merchant identifiers;
    computing and normalizing a plurality of merchant fraud scores for each of the merchant identifiers based at least in part on the counted members and the number of the plurality of transactions corresponding to each merchant identifier;
    balancing each of the plurality of merchant fraud scores corresponding to each of the merchant identifiers based at least in part on center values for merchant identifier groups;
    summing the plurality of merchant fraud scores corresponding to each of the merchant identifiers.

12. The non-transitory computer-readable storage media of claim 11, wherein the computer-readable instructions further instruct the one or more processors to delineate the merchant identifier groups based at least in part on the numbers of the plurality of transactions corresponding to the merchant identifiers.

13. The non-transitory computer-readable storage media of claim 11, the representation of historical data of each smart agent corresponding to a profile comprising a time interval series of attributes mined from historical transaction data, wherein computing the fraud score for each of the plurality of transactions includes—
    matching the transaction to the corresponding profile;
    incrementally changing a fraud risk based on attribute-by-attribute comparison of the transaction data corresponding to the transaction against the profile;
    outputting the fraud score for the transaction based at least in part on the comparison against the profile.

14. The non-transitory computer-readable storage media of claim 11, the representation of historical data of each smart agent corresponding to three profiles each comprising a time interval series of attributes mined from historical transaction data, wherein computing the fraud score for each of the plurality of transactions includes—
    matching the transaction to the three profiles, the three profiles being respectively matched based on the payment card identifier, the merchant identifier and an identified device corresponding to the transaction;
    incrementally changing a fraud risk based on attribute-by-attribute comparison of the transaction data corresponding to the transaction against the profiles;
    outputting the fraud score for the transaction based at least in part on the comparison against the profiles.

15. A computer-implemented method for detection of merchant data breaches comprising, via one or more transceivers and/or processors:
    receiving transaction data corresponding to a plurality of transactions associated with a plurality of transactional entities, the transaction data including a merchant identifier and a payment card identifier for each of the plurality of transactions;

computing a fraud score for each of the plurality of transactions at least in part by— inputting transaction data of the transaction to a classification model and a smart agent associated with the corresponding transactional entity to generate a first output from the smart agent and a second output from the classification model, the smart agent comprising a representation of historical data of the corresponding transactional entity and the classification model being constructed according to one or more of: data mining logic, a neural network, case-based-reasoning, clustering, fuzzy logic, a genetic algorithm, a decision tree, and business rules, analyzing the first output and the second output using a weighted summation to generate the fraud score for the transaction, identifying a subset of the fraud scores for the plurality of transactions, each of the fraud scores of the subset exceeding a first threshold;

counting members of the subset corresponding to each of the merchant identifiers;

generating a final merchant fraud score for each of the merchant identifiers based at least in part on the count of members of the subset corresponding to each of the merchant identifier;

comparing the final merchant fraud score for at least one of the merchant identifiers against a second threshold to identify a possible breach;

issuing a warning based on the identified possible breach.

16. The computer-implemented method of claim 15, wherein generating the first output for each of the plurality of transactions includes comparing contents of at least one data field of the transaction data against a profile of the smart agent associated with the transactional entity corresponding to the transaction.

17. The computer-implemented method of claim 15, wherein analyzing the first output and the second output using the weighted summation includes retrieving one or more client tuning inputs and incorporating the one or more client tuning inputs into the weighted summation.

18. The computer-implemented method of claim 15, wherein generating the final merchant fraud score for each of the merchant identifiers includes— counting the number of the plurality of transactions corresponding to each of the merchant identifiers;

computing and normalizing a plurality of merchant fraud scores for each of the merchant identifiers based at least in part on the counted members and the number of the plurality of transactions corresponding to each merchant identifier;

balancing each of the plurality of merchant fraud scores corresponding to each of the merchant identifiers based at least in part on center values for merchant identifier groups;

summing the plurality of merchant fraud scores corresponding to each of the merchant identifiers.

19. The computer-implemented method of claim 18, further comprising delineating the merchant identifier groups based at least in part on the numbers of the plurality of transactions corresponding to the merchant identifiers.

20. The computer-implemented method of claim 18, the representation of historical data of each smart agent corresponding to a profile comprising a time interval series of attributes mined from historical transaction data, wherein computing the fraud score for each of the plurality of transactions includes— matching the transaction to the corresponding profile;

incrementally changing a fraud risk based on attribute-by-attribute comparison of the transaction data corresponding to the transaction against the profile;

outputting the fraud score for the transaction based at least in part on the comparison against the profile.

* * * * *